(12) United States Patent
Connelly et al.

(10) Patent No.: US 7,720,194 B2
(45) Date of Patent: May 18, 2010

(54) HIGH THROUGHPUT BAGGAGE INSPECTION SYSTEM

(75) Inventors: James M. Connelly, St. Petersburg, FL (US); Paul Green, Clearwater, FL (US); Joseph G. Nuttall, Germantown, TN (US)

(73) Assignee: L-3 Communications Security and Detection Systems Inc., Woburn, MA (US)

( * ) Notice: Subject to any disclaimer, the term of this patent is extended or adjusted under 35 U.S.C. 154(b) by 83 days.

(21) Appl. No.: 12/069,059

(22) Filed: Feb. 6, 2008

(65) Prior Publication Data

US 2008/0198967 A1    Aug. 21, 2008

Related U.S. Application Data

(60) Provisional application No. 60/901,744, filed on Feb. 16, 2007.

(51) Int. Cl.
*G01N 23/04*    (2006.01)
(52) U.S. Cl. ........................................... 378/57
(58) Field of Classification Search .................... 378/57
See application file for complete search history.

(56) References Cited

U.S. PATENT DOCUMENTS

| 5,600,303 | A | 2/1997 | Husseiny et al. |
| 5,642,393 | A * | 6/1997 | Krug et al. ..................... 378/57 |
| 6,812,426 | B1 | 11/2004 | Kotowski et al. |
| 7,263,160 | B2 | 8/2007 | Schlomka et al. |

FOREIGN PATENT DOCUMENTS

| JP | 11-160253 A | 6/1999 |
| JP | 2001-233440 A | 8/2001 |
| JP | 2003-207464 A | 7/2003 |

OTHER PUBLICATIONS

International Search Report and Written Opinion for International Application No. PCT/US2008/002018.

* cited by examiner

*Primary Examiner*—Courtney Thomas
(74) *Attorney, Agent, or Firm*—Wolf, Greenfield & Sacks, P.C.

(57) ABSTRACT

A stand-alone inspection system operating reliably with high throughput. The system employs automated image analysis to distinguish between cleared items and suspicious items. Cleared items pass through the inspection system without stopping, but the system stops suspicious items at a predetermined location so that the alarmed items can be readily identified by an operator. The system also displays information on the items that allows an operator to confirm that the item in the predetermined location is an alarmed item. Rather than resolving the alarmed item with the system stopped, the operator records an indicia of the alarmed item and the alarmed item is removed for further inspection or other processing. The recorded indicia provides a tracking mechanism that ensures alarmed bags are resolved.

28 Claims, 8 Drawing Sheets

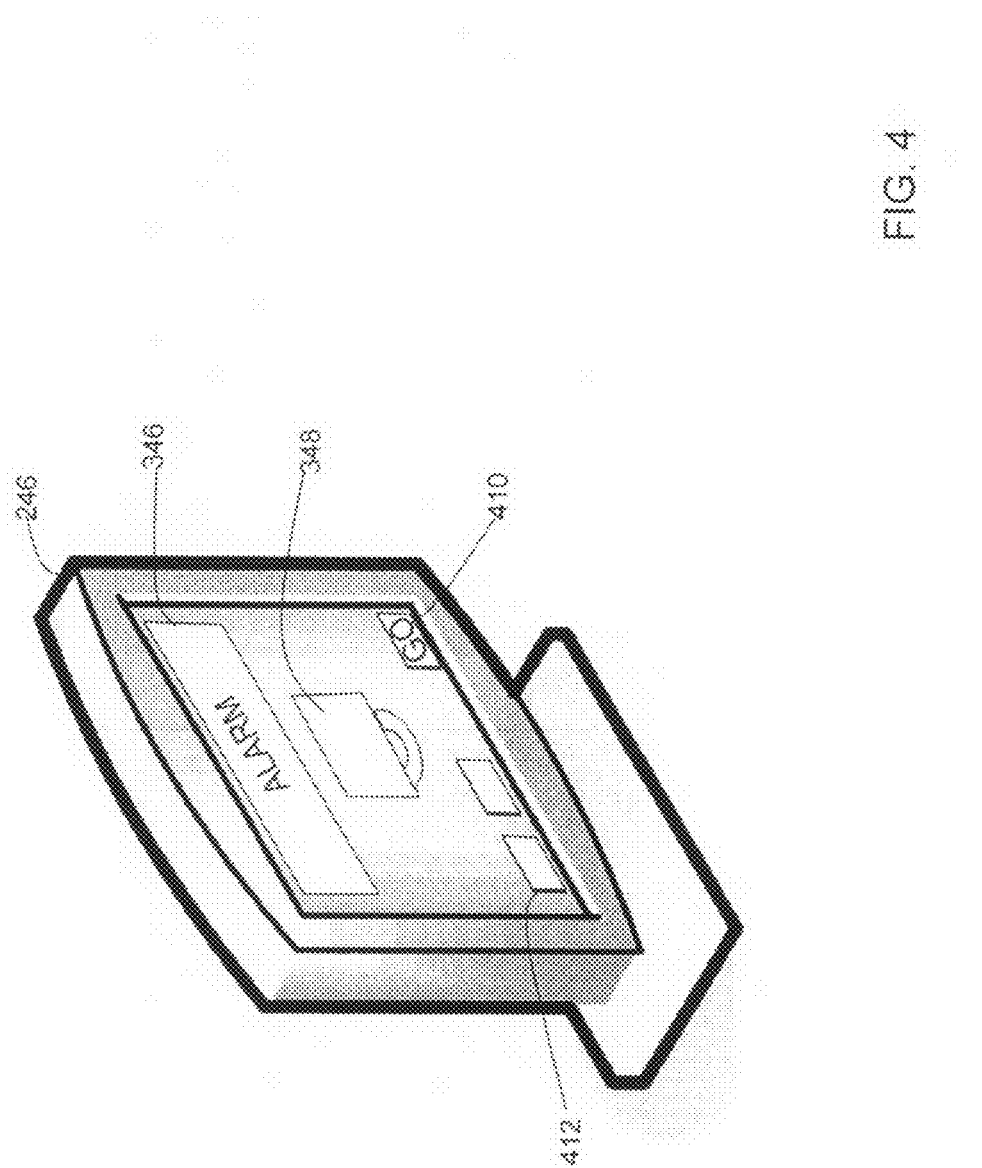

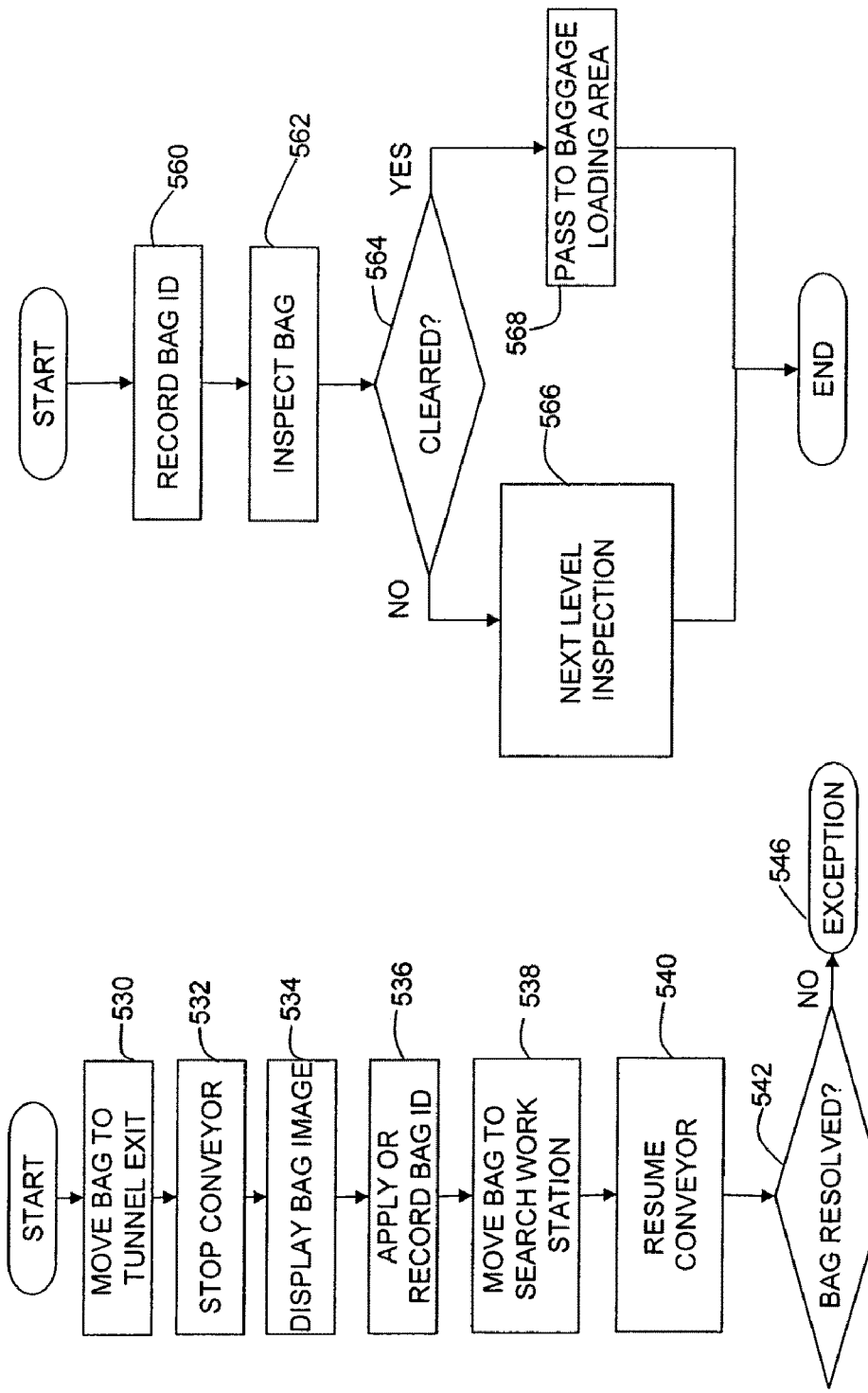

HIGH THROUGHPUT BAGGAGE INSPECTION SYSTEM

This application claims the benefit under 35 U.S.C. §119 (e) of U.S. Provisional Application Ser. No. 60/901,744, filed Feb. 16, 2007. The entire contents of the foregoing application is incorporated herein by reference.

BACKGROUND OF THE INVENTION

1. Field of the Invention

This invention relates generally to security inspection systems and more specifically to stand-alone, high throughput inspection systems.

2. Related Art

Security inspection systems are widely used to inspect baggage, parcels or other items before those items are allowed into secured areas. For example, in the U.S., passenger baggage is inspected prior to loading the baggage onto aircraft. In this setting, inspection systems are frequently used to ensure that no baggage containing explosives is loaded onto the aircraft. In addition, security inspection systems may be used to detect other contraband objects, such as drugs, weapons or smuggled currency. Further, security inspection systems may be used in other locations within airports or in other settings where it is desired to create a secured area, such as at cargo terminals or at the perimeters of public spaces.

The challenges that must be met by systems for inspecting baggage to be loaded onto aircraft are representative of challenges that must be met by security inspection systems in many other settings. On the one hand, because of the risk of harm to people and property caused by allowing baggage containing explosives onto an aircraft, the inspection systems must reliably detect contraband. On the other hand, large amounts of baggage frequently must be inspected in short periods of time. Thus, security inspection systems must have a high throughput, which reduces the amount of time available to inspect each item.

To aid in reliably and rapidly inspecting baggage, high throughput baggage systems employ automated image analysis. An imaging unit acquires data on each item to be inspected. This data is correlated spatially to the item under inspection and therefore provides a multi-dimensional representation of the item that can be regarded as an image of the item. Frequently, the data depicts in three-dimensions the density of the item under inspection. Regardless of the form in which information about the item is represented, automated image analysis may be used to detect regions within the image, called "suspicious regions," having shape density or other characteristics consistent with explosives or other contraband objects. When a suspicious region is detected, an item is said to be "alarmed." Further processing is required to resolve an alarmed item, either by determining that the item contains no contraband or determining that the item needs to be processed as if it contains contraband.

In some airport settings, security inspection systems are built into the baggage handling system in what is called an in-line configuration. Items move on conveyors to and through the inspection system. Conveyors then move the items to locations selected based on automated analysis performed by the inspection system. The security inspection system interfaces with the baggage handling system controlling the conveyors so that when an item is alarmed, it is automatically diverted by the baggage handling system to a search station for further processing. Further processing at the search station may include human analysis of a visual representation of the image of the alarmed item and, if human analysis of the image is inconclusive, may include a physical search of the item.

In many airports, security inspection systems are not incorporated into the baggage handling system. Rather, they operate in a "stand-alone" configuration. Stand-alone inspection systems may operate in what is called "hold for decision" mode. In this mode, the system processes one bag at a time and if that bag alarms, may hold that bag in its position until a human operator has determined that the bag is "cleared" or is "alarmed" and must be diverted for a higher level inspection. Because bags move through the inspection system sequentially on a conveyor, holding a bag for a decision can stop processing of other bags.

To make a determination on an item, the system displays in visual form an image of the item. When the automated threat detection system identifies a suspicious region, the system automatically displays an alert for a human operator. As part of the alert, the image of the item under inspection is presented to the operator with an indication of regions depicting the suspicious object inside the item. The human operator can then study the image, allowing an operator to make a more sophisticated determination of whether the item may be cleared. If the operator clears an alarmed item, the item may be passed to the baggage loading area. Conversely, if the operator cannot clear the item, a baggage handler will move the item to a search station where the item will be further searched.

In "hold-for-decision" mode, the conveyor stops moving items under inspection when one item is deemed suspicious. By stopping motion of the conveyor, the risk that an item containing contraband will be inadvertently passed to the baggage loading area is greatly reduced.

Inspection systems that can be configured to operate in either hold-for-decision mode or in-line mode are known. One such system has three conveyor stages and two scanning stages. These two stages are a projection X-ray scanner and a CT scanner. The system uses the result from the first scanning stage, which is the projection x-ray stage, to select locations for the second stage, the CT stage, to collect data on "slices" through an item under inspection.

In stand-alone operation, an operator loads bags, one after another, onto a ramped input belt. The system advances the bag to the downstream end of the input belt and holds it there until it is cleared for induction into the projection scanner. As the bags move through the system, the projection scanning section may scan one bag while the CT section is collecting slices on an earlier bag. Because the projection scanner scans a bag faster than the CT scanner, when the projection scanner is done with its bag, it parks it at the end of the projection scanner belt awaiting clearance to inject it into the CT section.

Analysis of the CT slices occurs while the CT scanner is collecting slice data, so an analysis result is often available shortly after the last slice is collected. If, as a result of the analysis, the bag is cleared, the CT section can eject the bag onto an exit ramp. Once the bag in the CT stage is ejected, the bag in the projection section moves into the CT section.

Because bags in both the projection scanner stage and the CT scanner stage are often several feet from their next desired position, after the CT stage determines a screening result, a belt moves the bag at very high speed to maintain throughput. However, once the belt moves a bag in the projection scanner completely out of the projection scanner, the belt slows down to normal scanning speed and the bag on the input ramp moves into the projection scanner, creating the image as it moves through. At the same time, the next bag (already loaded onto the bottom of the input ramp) is moved into position at the top (downstream end) awaiting injection into the projection scanner.

Conversely, if the bag in the CT section is classified as a suspicious bag, that bag remains in the CT section while the operator reviews an image of the bag. As a result, both the CT and projection scanners remain idle until the operator reaches a decision.

Once the operator reaches a decision, regardless of whether the decision is to clear or alarm the bag, the system will eject the bag, using the process described above to advance the bag. If the operator clears the bag, it will be forwarded to its final destination. If the operator alarmed the bag, the operator will take possession of the bag or direct a colleague to do so, so that it can be searched.

One such commercially available system requires an operator to provide a barcode for each bag as bags are being loaded. The system will not inject a bag into the projection scanner until such a barcode is entered, but the rest of the system can continue to work while the input ramp waits on the barcode.

The entered barcode is then associated with the bag image. It is used to track the bag and in some cases is used to influence exactly how the automated system analyzes the bag, including by specifying that the detection algorithm use a more or less sensitive setting. The barcode is also used to recall a bag image on a search station if a bag requires manual searching or other review after the original operator review.

In stand-alone operation, such a system provides good tracking and little opportunity for mistaking an alarmed bag for a cleared one. Because only one bag appears on each scanning belt segment at a time, the display is associated with the next bag to exit the scanner and there is a distinct delay between the ejection of one bag and the next. The system operating in stand-alone mode also provides for good resistance to operator error in input barcodes because the system will hold a bag at the input point until a proper barcode is read. This approach, however, limits the total throughput because each bag is always far from where it needs to be next when the authorization to move is received. The system attempts to address this issue by running its belts at two very different speeds, requiring more expensive motors and controller hardware. Further, the system must be run with a distinct, independent input ramp, which adds costs that are not justified in all cases.

The same type of system may be used in an in-line application. In an in-line application, the system operates in a similar fashion. However, the bag is loaded by an external baggage handling system (BHS) that moves bags throughout the airport. The BHS provides an identifying number (ID) for each bag in place of a barcode (the number may in fact be the barcode of the bag, but does not need to be). The ID is provided as the bag passes a predetermined point in the scanner.

When the BHS delivers a bag to a search station, it can provide the number to the personnel taking possession of the bag via a dedicated number display. The search personnel can then use this number to pull up information about the bag on their search workstation. If the ID is the barcode, it is not necessary for the operator to enter a number because the operator can read the number on the barcode tag.

Another difference between in-line and stand-alone modes is that in in-line mode the bag is not stopped inside the machine if it alarms, but instead progresses along belts controlled by the exterior baggage handling system (BHS), which carries it to a diversion point. If the operator clears the bag before it reaches the diversion point, the bag continues onto the airplane. If the operator does not clear the bag by then (either alarms it or fails to clear it), the BHS diverts the bag to the search room for further processing.

In a networked in-line environment, multiple machines and operator stations are connected together such that one operator can review the images from several scanners or multiple operators can work on the bags from one machine, depending on the rate at which bags are provided for inspection.

In in-line installations, tracking and routing of the bags and correlation of the results to the bags is accomplished via the BHS. These functions are possible because there is no manual intervention in the movement of the bag until it reaches its exit (either at the "plane" or at the search room).

Another commercially available system includes one scanner segment and two radiation tunnel segments. Such a system can be configured to operate in in-line mode, as described above. In a stand-alone mode, operation is different.

Each system has its own conveyor belt. In the most common implementation, the tunnels have a ramped portion of their conveyor that extends from the tunnel and shares the same conveyor belt and motor. Bags can be laid onto the extension and carried into the system on the conveyor. For this system, multiple bags can exist on the input conveyor belt, with a spacing between bags as small as a few inches. As with the previously described system, bags are stopped at the downstream end of the input tunnel and only one bag is allowed to enter the scanner section at a time.

Once the bag is scanned, it moves to the output tunnel and holds there until the system makes an automated decision on whether to clear or alarm the bag. If the system automatically clears the bag, the bag proceeds through the exit tunnel to where it can be manually sent to its destination (such as a loading area for an airplane), and the next bag is injected into the scanner segment.

Conversely, if the system alarms on the bag, the bag continues to wait where it is until the operator renders a decision. If the operator clears the bag, the bag is released and it continues to its destination as above. If the operator alarms on the bag, the operator will take possession of the bag or direct a colleague to do so as it emerges from the exit tunnel, so that it can be searched.

If a barcode is needed for tracking the bag, an operator can input a barcode to be associated with a bag image. The system applies these barcodes in a FIFO manner as the bags are released into the scanner segment. The system does not force the operator to put in a barcode before it will take a bag. However, the input tunnel belt runs only if it has clearance to release a bag at the downstream end. If the belt were to stop to prevent a non-barcoded bag from entering the tunnel, the release of the downstream bag into the scanner could be fouled, making tracking difficult. Consequently, the system is more susceptible to operator error than the previously described system, because the operator could inadvertently insert a bag without a barcode, throwing off the FIFO assignment.

This problem can be avoided by using an input conveyor without the ramp extension and adding a separate input ramp. However, these components add cost and complexity to the product. As with the previously described system, this method provides good tracking and little opportunity for mistaking an alarmed bag for one that has been cleared for loading onto a airplane. However, it processes bags with low throughput. Whenever a bag is transiting the distance from the input tunnel to the scan plane, the system is idle. In standard operation, this idle time limits the throughput to less than half the rate observed on the same system in an "in-line" setting where bags are fed one after the other.

Systems for inspecting carry on baggage are also known. Conventional carry on inspection systems do not make an automated decision, and a decision to alarm or clear a bag is always made by an operator. In a conventional system, baggage is loaded (by the passenger) onto the scanner belt directly. The operator controls the belt motion manually. As images are collected, they are displayed on the screen for the operator to evaluate as they appear. If the operator has not made a decision by the time the next bag starts imaging, the operator will stop the belt and leave it stopped until the operator makes a decision. If the operator decides to clear the bag, he will restart the belt, and the bag will eventually come out to where the passenger can reclaim it. If the operator alarms on the bag, the operator will advance the belt to where the bag is accessible to operator personnel, but not the passenger. The operator or a colleague will then carry out further inspection of that bag based on information about what concerned the operator in the x-ray image.

SUMMARY OF INVENTION

In one aspect, the invention relates to a method of inspecting a plurality of items. As part of the method, data is obtained on each of the plurality of items and automatically analyzed to identify an item of the plurality of items as a suspect item. The plurality of items are moved on a conveyor to a reference point, but the conveyor stops when the suspect item reaches the reference point.

In another aspect, the invention relates to a method of inspecting a plurality of items. According to the method, the plurality of items are moved through an inspection area. For each item of the plurality of items, x-ray scan data is collected as the item passes through the inspection area. The collected x-ray scan data is analyzed to identify whether the item is a suspect item. If the item is a suspect item, motion of the plurality of items is stopped when the suspect item is at a predetermined location adjacent an exit of the inspection area.

In another aspect, the invention relates to an inspection system adapted to inspect a plurality of items. The inspection system comprises an inspection area and a conveyor moving through the inspection area. A display is positioned adjacent the exit of the inspection area. A scanner adapted to obtain identifying information from an item under inspection is positioned adjacent the exit.

In another aspect, the invention relates to a method of operating an inspection system comprising an active scanning region to inspect a plurality of items in a stream. The method includes positioning items in the stream on a conveyor with a gap between adjacent items in the stream approximating the length of the active scanning region of the inspection area. Items in the stream move on the conveyor through the active inspection area and data indicative of contents of each item in the stream is collected as the item passes through the active inspection area. This information is used to automatically identify an item in the stream as a suspicious item. In response to identifying a suspicious item, the conveyor stops with the suspicious item and a preceding item in the stream positioned with the active scan region aligned with the gap between the suspicious item and the preceding item.

In another aspect, the invention relates to a method of inspecting and controlling a plurality of items. The method includes moving the plurality of items through an inspection area towards a control area. Data indicative of contents of each item is collected as the plurality of items pass through the inspection area. The data on each item is analyzed to determine whether the item is an item of interest. The motion of the items is controlled such that i) no item passes through the control area before analysis of data on the item is complete, and ii) when analysis of data on an item has been completed and the item has been found to be an item of interest, that item of interest does not exit the control area without positive indication from an operator that the operator is aware of the item's status and is ready to remove the item from a stream of cleared items.

In a further aspect, the invention relates to a method of inspecting a plurality of items. The method includes moving the plurality of items through an inspection area. The items are physically spaced such that a gap between items is effectively minimized but is greater than or equal to the length of an active scanning region of the inspection area. The length of the items is measured and data indicative of item content on each item is collected as the plurality of items passes through the inspection area. Movement of the items is controlled such that: i) no item exits a control area before analysis of data collected on the item is complete; ii) stopping movement of the items is coordinated to align the active scan region with the gap between items; iii) the measured item lengths are used to allow additional items to be scanned if the items can be advanced to align the next gap with the active inspection area without advancing an item for which data analysis has not been completed exits the designated control area. The collected data is analyzed to determine whether each item is of interest.

In a further aspect, the invention relates to a method of manually verifying the tracking of a plurality of items being inspected. The method includes moving the plurality of items through an inspection area and collecting data on each item as the plurality of items passes through the inspection area. The data collected on each item is displayed near the exit of the inspection area such that the data displayed is correlated in time to when the physical item corresponding to the data is passing the display point. The item passing the display point is examined to verify that it matches the data displayed, allowing a determination to be made that the system is tracking properly.

In a further aspect, the invention relates to a method of inspecting a plurality of items that decouples human inspection tasks from automated tasks. The method includes moving the plurality of items through an inspection area and collecting data indicative of item content on each item as the plurality of items passes through the inspection area. The collected data is automatically analyzed to identify whether the item is a suspect item or a cleared item. Each physical item is correlated with its automated results and data via a physical indicia associated with the physical item. The items automatically identified as suspect are manually sorted from those items cleared. The suspect items are transferred to a search station, allowing the automated inspection of subsequent items to continue independent of the rate of manual review. The automated decisions and associated data (images, etc.) are manually reviewed at the search station to resolve whether the suspect items can be cleared. If the item can be cleared based on review of the automated decisions and data, the item may be manually transferred to its destination without physical search. If after review the item cannot be cleared, the item may be physically searched to verify that the suspicious region is not a concern.

In a further aspect, the invention relates to a method for associating physical indicia with data and results for a plurality of items being inspected. The method includes moving the plurality of items through an inspection area and collecting data on each item as the plurality of items passes through the inspection area. An indicia of each item is recorded after the inspection data has been collected. The recorded indicia is associated with the inspection data of the item.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 is a sketch of an operator display that may be used in an inspection system according to an embodiment of the invention;

FIG. 5B is a flow chart of a process for handling an alarmed bag according to an embodiment of the invention;

FIG. 5C is a flow chart of a process for second level inspection of an alarmed bag according to an embodiment of the invention;

DETAILED DESCRIPTION

Figure 1:
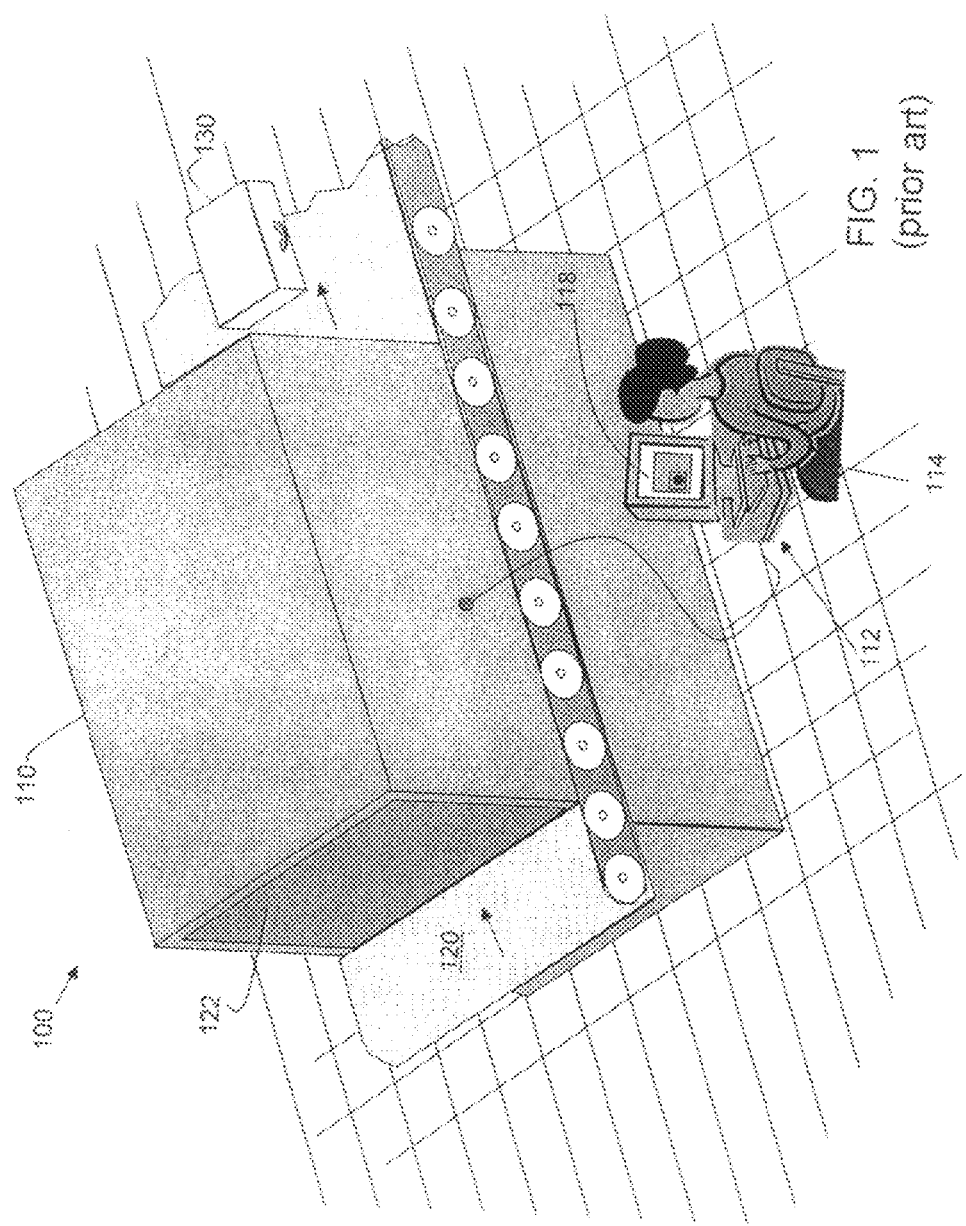
FIG. 1 is a sketch of a prior art inspection system.

FIG. 1 illustrates a prior art inspection system, components of which may be incorporated into an improved inspection system according to embodiments of the invention as described in more detail below. FIG. 1 illustrates a stand-alone inspection system of the type that may be used at an airport to inspect checked baggage for contraband, particularly explosives.

Inspection system 100 includes a conveyor, here shown as belt 120, that moves items under inspection through an inspection area 110. Items under inspection move on belt 120 into tunnel 122, allowing the items under inspection to enter inspection area 110. As an example of an item to be inspected, bag 130 is shown after it has passed through inspection area 110.

Within inspection area 110, data is collected on the items, which is then analyzed to determine whether items under inspection contain contraband. Such data may be collected by scanning the items under inspection with x-rays, though other types of inspection systems are known and may be used in embodiments of the invention. For x-ray inspection, the item may be exposed to radiation and the intensity of the radiation after it has passed through the item may be measured at multiple points throughout the item under inspection. The intensity is an indication of attenuation of radiation by objects inside the item and therefore is an indirect indication of material properties of objects inside the item. Many techniques are known to convert measurements of x-ray intensity into a representation of objects inside an item under inspection. Techniques are known that can produce two-dimensional and three-dimensional representations of the objects. Two-dimensional representations may be produced, for example, using techniques known as projection imaging. Three-dimensional representations may be produced using a technique known as computed tomography (CT), but other multi-view techniques are also known.

Regardless of the specific technique used to image the item under inspection, the resulting data may be passed to an analysis station, where it is processed by computer. The computer processes the data representing the item to identify regions of the object that have characteristics that could indicate contraband within the item under inspection. Analysis station 112 also uses the data collected on the item under inspection to produce a display 118 for a human operator 114.

Display 118 typically contains an image of the item under inspection in visual form with any suspicious regions identified by computer analysis highlighted for the human operator 114. Human operator 114 therefore has both the results of computer analysis of the data and image data that allows the operator to make a decision on whether each bag contains contraband. If the operator determines that the bag does not contain contraband, the operator will indicate that the bag is cleared. Alternatively, if operator 114 suspects that an item contains contraband, or cannot conclusively determine that an item is free of contraband, operator 114 may indicate that the bag should be routed for further search. When a bag is indicated for further searching, a human baggage handler (not shown) removes the bag from belt 120 and carries it to a separate search station (not shown).

To allow operator 114 time to analyze information on display 118, inspection system 100 may operate in "hold for decision" mode. Once data on a bag is collected, belt 120 stops until operator 114 makes a decision. If operator 114, after inspection of the information presented on display 118, determines that the bag does not contain contraband, the operator may provide an input at analysis station 112 indicating that the bag has been cleared. Thereafter, belt 120 may resume motion, carrying the bag to an area where it can be loaded onto an aircraft. Conversely, if operator 114 determines that further inspection is required, a baggage handler may remove the bag for further search.

The inventors have appreciated that a stand-alone inspection system using the "hold for decision" mode of operation may result in an undesirably low throughput for inspection. There is no time limit within which the human operator must resolve a bag. Nonetheless, while the human operator is studying information on display 118, other bags are not moving through inspection system 100.

The inventors have observed that, as a reaction to loss of throughput, some operators of stand-alone inspection systems override the hold for decision mode of operation. When overridden, belt 120 moves continuously through tunnel 122 and bags are fed into inspection area 110 in a continuous stream. The conveyor does not stop when a bag is alarmed. Rather, an operator viewing a visual display of the images of alarmed items may quickly make a determination of whether the item can be cleared or requires further search. If the operator believes an item needs further search, the operator viewing the image may call out to a baggage handler waiting near the exit of the inspection machine to move the bag to a search area. Based on the image of the bag displayed, the operator may describe the outline of a bag for the baggage handler to remove from the moving conveyor.

A drawback of overriding the hold for decision function of the inspection system is that the baggage handler must rely on a description of the alarmed bag provided by operator 114. The baggage handler must then correctly select a bag matching the description.

The inventors have appreciated that the process of selecting a bag at the exit of inspection area 110 increases the risk that a bag containing contraband will unintentionally pass the inspection area because the baggage handler selects the wrong bag from the moving conveyor. For example, if a bag with a shape similar to an alarmed bag is inspected immediately before the alarmed bag, the baggage handler may mistake the similar looking bag for the alarmed bag and remove the incorrect bag for further search. Additionally, an operator rushing to make a determination of whether a bag should be cleared or diverted for further search may overlook indications of contraband in the image of the item and incorrectly clear the item.

The inventors have also appreciated that a continuous feed system, such as those known in the art, has the highest throughput when bags are submitted one after the other, with minimal spacing between bags. Operating the system in continuous flow mode makes it difficult for operators or other baggage handlers to figure out which bag caused an alarmed image to appear on the operator's screen. Further, if the operator takes any significant time on an alarm, the conveyor may have moved the bag well away from the scanner before a decision to take possession of a bag is made. This scenario makes it very likely that alarmed bags will get sent onto the plane without going for further searching.

To overcome these deficiencies, the bag may be stopped in the tunnel where a baggage handler cannot grab it until a final result is obtained. However, stopping the alarm bag in this fashion also stops all the bags behind it. If a bag is stopped while it is in the active scanning region of a scanner, the image can be corrupted (particularly for volumetric scanners). A current approach allows only one bag into the scanner segment at a time. The next bag is not released into the scanner until a final decision is made on the first bag. This maintains strict control, but at a large cost in throughput.

One approach to addressing this problem in some embodiments of the invention is to automatically separate the bags at the transition point between the input belt and the scanner belt to minimize the gapping while assuring that a space at least as large as the scanning region exists between adjacent bags. As a result, multiple bags will be allowed in the scanner concurrently, but the bags are "gapped" so that they are separated by no less than the length of the active scanning region.

With this gapping, a first bag may be allowed to proceed through the scan region. The belt may stop such that only the space between the first and second bag exist in the scan region. The bags may wait in this position until a screening result (automated and possibly operator) are available. Once the final result is available, the bag is released. If the final decision is that the bag is alarmed, the operator will take possession of bag or direct a colleague to do so.

As a modification that may be used in some embodiments of the invention, if the operator has alarmed a bag, the bag may be held in the same position until the operator or baggage handler signals they are ready to take possession of the alarmed bag (via a button near the exit of the tunnel or softkey on a baggage viewing system screen or in any other suitable way). This gives high certainty that the bag will be handled properly.

This approach minimizes the dead time between the time when the system authorizes the next bag being scanned and actually scanning it (because the next bag is parked just before the scanning region rather than several seconds away). It also does so without the need for running the belt at a very high speed "advance" mode. It does still have some dead time while the automated and operator decisions are reached.

A further modification that may be used in some embodiments is to conditionally scan subsequent bags while an earlier bag is being held at a decision point. If the scan segment is large enough to accommodate the next bag without pushing the currently held bag beyond the designated holding point, the system may scan the next bag. In this way, knowledge of the position in which the first bag is being held as well as the measured lengths of the subsequent bag, increases the utilization of the space between the scanning region and a designated holding point.

Utilization of the space between the scanning region and a designated holding point can be achieved by gapping the bags as described above and recording the length of bags are as they transition to a scanner belt (based on time photo eye is blocked). For example, a first bag may pass through the scan region. If the distance to the holding point is greater than the length of the next bag, the next bag is allowed to pass through the scanner region while the analysis of the first bag is being carried out (else stop until final result on first bag is available before scanning next bag). If a final decision on a first bag is not available, a third or subsequent bag can be allowed through the scan region if the distance of the first bag to the holding point when the subsequent bag is ready to enter the active scanning area is greater than the length of the subsequent bag. The distance of the first bag to the holding point at any time can be estimated based on the measured length of the first bag and recorded motion of the conveyors on which the bag travels.

This approach reduces the idle time for the scanner while decisions are being reached. It requires components integrated with the internal conveyor system to track the size and position of items moving through the inspection system, but results in significant increases in throughput.

The inventors have further appreciated that, even with sophisticated tracking sensors and algorithms, the possibility of losing track and attributing the results of one bag to another still exists. This can result in a bag that needs to be searched erroneously heading to the airplane. This mistake is most often recognized when a bag thought to be an alarmed bag gets to the search table and its shape or contents do not match the alarmed bag. A very expensive search may ensue when such an error is discovered, requiring an airplane to be delayed while the baggage hold is emptied looking for the erroneously released bag. The best time to catch this problem is before the bag leaves the inspection station, at the exit of the scanner. However, as higher throughput approaches to stand-alone inspection are put in place, the task of verifying tracking accuracy becomes more difficult.

To improve tracking accuracy, an inspection system may have a display specifically targeted for verifying tracking. The display may be physically located at the exit (or take away) section of the scanning system. Rather than showing the image data for the latest bag analyzed, as is the case with most viewing stations, this display may display the baggage data that the system currently associates with the bag it believes is passing the exit station. If the system is tracking properly, the image will match the general outline of the physical bag emerging. The image may be presented in any suitable format. In some embodiments, the image will be formatted to emphasize the exterior of the bag rather than its contents. Another embodiment may include a digital photo of the bag taken while the bag was in the scan plane. If the system is off track, the image will not match the bags visible at the exit point of the system and the human operator can readily see that a problem has occurred. As a result, action can be taken before the bag gets away from the inspection, which could require a search for the bag. Searching for a bag that has improperly passed a security check-point can be expensive and/or disruptive. In an airport setting, an entire terminal may be affected.

The inventors have appreciated that, even with better schema for getting more bags through the system, operator review of the images can cause the scanner to remain idle for a significant fraction of the operating time. In fact, as throughput grows through methods discussed above, the time taken for operator review may become a larger percentage of the operating time of the system and may become the limiting factor when the operator is unable to keep up with the full throughput of the system.

To improve throughput, it may be desirable to move the operator decision to after the manual sortation of the baggage. This allows clear bags (which represent the majority of bags) to go on their way, while an operator considers the alarm bags independently. This process may be facilitated by associating some physical indicia (such as a barcode) with the automated bag data (image and decision). Using the indicia, an operator can, upon receiving any bag that was alarmed, immediately pull up the associated data.

If the system runs so fast than an operator cannot inspect alarmed bags as fast as the system can generate them, multiple operator stations may be networked to a single scanner to keep up with the load. Conversely, in slow times one operator could handle the images from several machines servicing different areas. Though load balancing is known in other contexts, in this context, load balancing is enabled in this context by moving the operator inspection to after the manual sortation.

The inventors have also appreciated that bar code entry at the input of a system requires a significant tracking effort from the time the barcode is entered until the bag is finished all processing. When barcodes are not collected, the bags need only be tracked from the scan region until all processing is finished. The tracking at the front end is subject to human error in the barcode application process. It often requires a separate independent input conveyor ramp automatically controlled in an attempt to minimize human error.

However, if the barcode is only desired for recalling data about the bag (vs. dictating what level of security to apply to the bag) then it does not need to be collected up front, or on every bag. Instead a barcode station could be placed at the output of an inspection system where it can be used to barcode bags that have alarmed. The system may be configured to hold bags that alarm at the output point until a barcode is applied. The barcode number could then be associated with the bag record and images for the bag could then be recalled at a later time, as needed, using the barcode. Bags that clear do not need to be recalled and can be sent on their way without the burden of entering a barcode.

As an extension of this approach, exiting barcodes could still be used to drive a level of automated security applied to the bag. Because all the bag data is available, as bags exit the scanner, all bags could be bar coded. If a barcode indicates that a bag needs a different level of security than was applied by default, the bag could be analyzed at the new level and the new results recorded and used to decide the disposition of the bag. This approach is particularly applicable in scenarios in which the operator has been moved to after the sorting step because it avoids having the operator interact with a bag twice.

Because bar coding after inspection reduces the burden of tracking bags, it also reduces tracking errors. In addition, it eliminates the need for special equipment at the input used in barcoding, such as an independent loading ramp.

Figure 2:
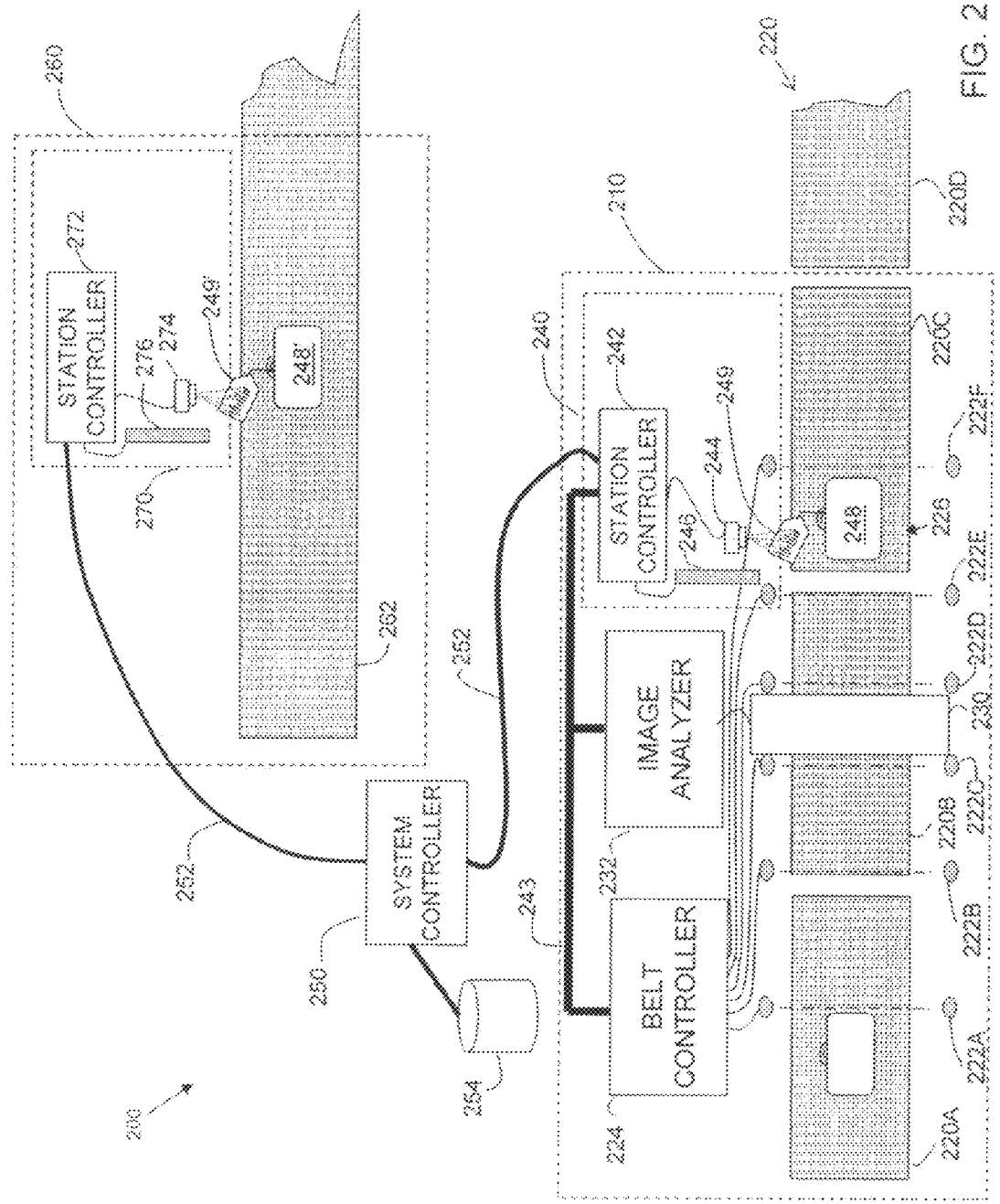
FIG. 2 is a schematic illustration of an inspection system according to an embodiment of the invention.

FIG. 2 shows an improved configuration for a stand-alone inspection system providing both accuracy and high throughput, which may be controlled to implement one or more of the improvements described above. FIG. 2 shows schematically a plan view of an inspection system 200. In the embodiment illustrated, items under inspection are checked passenger baggage at an airport. For example, a bag 248 is shown. However, any suitable items may be inspected and the inspection system may be used in any suitable setting.

Inspection system 200 includes a data acquisition system, here shown as imaging system 210, which may generally be in the form of imaging system 110 (FIG. 1), and a search station 260, which also may be generally as known in the art. However, any suitable imaging system or search station may be used. A system controller 250 may be connected to both imaging system 210 and search station 260 over network 252, allowing coordinated action within imaging system 210 and search station 260. System controller 250 may be any suitable control device. In some embodiments, system controller 250 may be implemented using a general purpose digital computer programmed to perform control functions as known in the art and as described below.

In the embodiment illustrated, system controller 250, inspection system 210 and search station 260 are shown located in close proximity. With search station 260 located close to imaging system 210, a human baggage handler may move baggage from imaging system 210 to search station 260. In other embodiments, a conveyor or other mechanized device may be used to transport baggage from inspection station 210 to search station 260, in which case imaging system 210 and search station 260 may be located in any suitable locations without regard to physical proximity. Likewise, though system controller 250 is shown in close proximity to imaging system 210 and search station 260, because system controller 250 is coupled to those devices through network 252, system controller 250 may be located in any suitable place reachable by a network 252. In this embodiment, network 252 is shown to be implemented using cables or other physical structures to interconnect devices. However, any suitable wired or wireless media may be used to implement network 252.

In the embodiment illustrated, system controller 250 interfaces to control devices within both imaging system 210 and search station 260. In some embodiments, system controller 250 may replace one or more controllers or processing devices in imaging system 210 and control one or more functions or analyze data associated with imaging system 210. Similarly, system controller 250 may also perform control or data processing functions associated with search station 260 instead of or in addition to station controller 272 contained within search station 260. Accordingly, the number and location of controllers is not a limitation on the invention.

In the embodiment illustrated, imaging system 210 includes a conveyor to move items under inspection through the imaging system. The conveyor may be implemented using motorized belts, here shown as belt 220. As pictured, belt 220 includes segments 220A, 220B, 220C and 220D. Belt segment 220A acts as an input segment, moving baggage or other items under inspection to an inspection area. Belt segment 220B moves items under inspection past an x-ray scanner 230. Belt segment 220C acts as an output segment, moving items under inspection away from the inspection area. Belt segment 220D may be a further segment that moves cleared items to a loading area or other location for further processing. Implementing belt 220 in separate segments may facilitate assembling a large system and allows the segments to be independently controlled in embodiments in which independent control is desirable. However, embodiments of the invention may include single segment belt or any of a variety of segmentation approaches. (Not a limitation . . . )

Sensors 222A, 222B, 222C, 222D, 222E and 222F may be positioned along belt 220 to detect positions of bags as they move through inspection system 200. In the embodiment illustrated, each of the sensors 222A, 222B . . . 222F may be implemented as a light beam sensor. When an item is present on belt 220 where a sensor is located, the item will break the beam of light and the sensor will detect an item based on lack of light crossing the belt. However, position sensors may be implemented in any suitable way, or may be eliminated by relying on belt motion, feedback and timing to assess the position and length of items under inspection.

Sensors 222A, 222B, 222C, 222D, 222E and 222F are coupled to belt controller 224. Belt controller 224 may be implemented in any suitable way. For example, belt controller 224 may be a microcontroller or microprocessor programmed to perform belt control functions as described herein. However, in some embodiments, belt controller 224 may be embedded in a single chip or may be discrete circuitry hardwired to perform control functions as described herein. Accordingly, the specific implementation of belt controller 224 is not a limitation of the invention and any suitable implementation may be used.

Using the sensors, belt controller 224 can detect the positions of items under inspection and then control motion of the belt segments to position the items as desired. Additionally, position sensors may aid in detecting the dimensions of an item under inspection. For example, sensors 222A and 222B are spaced to match the dimension of the longest item that inspection system 210 is configured to analyze. If an item is detected adjacent both sensors 222B and 222A, the item may be determined to have a length that exceeds the spacing between sensors 222A and 222B. Alternatively, the time that a sensor is blocked by an item in combination with information about the distance the belt moved in that time may allow a length of each item to be measured.

Position sensors 222A, 222B . . . 222F are positioned along belt 220 at multiple locations such that the progress of bags along belt 220 can be tracked. For example, position sensor 222B may be used to identify that a bag is entering an inspection area, such as a tunnel 122 depicted in FIG. 1. Likewise, position sensor 222C may be used to identify that a bag is moving into an active inspection area where it may be scanned by x-ray scanner 230. Likewise, position sensor 222D may indicate that the bag has passed x-ray scanner 230 and is leaving the active inspection area. Position sensor 222E may indicate that the bag is exiting the inspection area. Position sensor 222F may indicate that the bag has reached a predetermined location after it has exited an inspection area.

In the scenario illustrated in FIG. 2, bag 248 has a leading edge aligned with position sensor 222F. In this configuration, position sensor 222F will detect bag 248 is in handling area 226, which is a predetermined location relative to the exit of the inspection area.

In the embodiment of FIG. 2, multiple position sensors 222A, 222B . . . 222F are shown. Each of the position sensors detects a bag at a particular location by sensing when the bag breaks a light beam. However, other mechanisms, including other arrangements of position sensors, may be used to detect the position of a bag on belt 220. For example, a visual imaging system, coupled with image analysis, may be used to detect the position of a bag. Alternatively, a device to track motion of belt 220 may also be used as a mechanism to detect the position of a bag. With this approach, if at one time a bag is detected passing position detector 222B, the position of the bag at a later time can be determined by measuring motion of belt 220 between the time when the bag was detected adjacent position detector 222B and the later time. As a further example of a mechanism that may be used as a position detector, the position of a bag may be "detected" by positioning the bag in a predetermined location. For example, a gate across conveyor 220 may restrain a bag at a predetermined location. Because the position of the bag is then known, it may be regarded as having been "detected."

Regardless of how the position of the bag is detected, position information is provided to belt controller 224. In general, belt controller 224 operates the segments 220A . . . 220D to move bags through imaging system 210. Within imaging system 210, data on each item under inspection is collected.

In the embodiment illustrated, x-ray scanner 230 may be a multi-dimensional x-ray scanner, collecting x-ray attenuation data relating to a bag under inspection from multiple angles. In some embodiments, multi-dimensional measurements are made using a radiation source rotating around the bag on belt 220. In such an embodiment, image analyzer 232 may construct a three-dimensional image of the bag using computed tomography (CT). CT data may be collected as the bag passes through the active inspection area to create a volumetric scan of the item.

Other multi-dimensional analysis techniques may alternatively be used, including multi-view imaging techniques. Though, in some embodiments, a projection imaging system or other two-dimensional imaging system may be used. In some embodiments, x-ray scanners that collect data using radiation at multiple energy levels may be used. In those embodiments, image analyzer 232 may use the information collected at multiple energy levels to identify the atomic number of objects within the item. However, the specific type of data collected by x-ray scanner 230 is not a limitation on the invention and any suitable x-ray scanner or other data collection device may be used.

As the bags move past x-ray scanner 230, image analyzer 232 may capture data on each bag collected by x-ray scanner 230. Image analyzer 232 may construct a representation of the bag and objects in it based on this x-ray data. Image analyzer 232 may be a general purpose computer programmed to perform contraband detection algorithms on the image data. However, image analyzer 232 may be implemented with any suitable hardware component or components and may be programmed or otherwise controlled to perform any suitable image analysis techniques, whether now known or hereafter developed.

Regardless of the techniques employed by image analyzer 232, image analyzer 232 may output an indication of that analysis. In the embodiment illustrated, the indication may include multiple parts. One part of the indication may be a decision reflecting whether any suspicious regions were detected in an image of a bag. If so, the output of image analyzer 232 may indicate that the bag is "alarmed." Conversely, if no suspicious regions are detected, the output of image analyzer 232 may indicate that the bag is "cleared." In addition, image analyzer 232 may output image data on each item under inspection in one or more forms that are suitable for display to a human operator.

Image analyzer 232 and belt controller 224 are interconnected by network 243 so that these devices may share data. For example, data provided by belt controller 224 may allow image analyzer 232 to collect data only when an item under inspection is being moved past x-ray scanner 230. As another example, data provided by image analyzer 232 may allow belt controller 224 to move or stop items based on the result of the image analysis.

Network 243 may be implemented in any suitable fashion. For example, network 243 may be a point-to-point network implemented by discrete wiring between image analyzer 232 and belt controller 224. In other embodiments, network 243 may be implemented as a backplane or intrasystem bus contained within imaging system 210. In yet other embodiments, network 243 may be a wired or wireless network, such as may be operated according to the Ethernet protocol or other suitable protocol. One or more of the main function units represented in FIG. 2 (belt controller 224, image analyzer 232, station controllers (242 and 272), system controller 250 and database 254) may share resources, running on the same general purpose processor, or even as subroutines of the same process communicating through other methods such, as shared memory or shared variables.

Regardless of the specific implementation of network 243, network 243 allows image analyzer 232 to communicate to belt controller 224 whether a bag under inspection should be cleared or alarmed. In the embodiment illustrated, belt controller 224 continues to move belt 220 for each item that is cleared. Cleared bags may exit the inspection area on inspection area belt segment 220B and pass to output belt segment 220C. Belt controller 224 also may drive output belt segment 220C, passing a cleared bag to loading area belt segment 220D.

However, when image analyzer 232 indicates that a bag is alarmed, belt controller 224 may operate belt 220 to stop the bag at a predetermined position, which is here shown to be baggage handling area 226 and is adjacent the exit of the inspection area. In the embodiment illustrated, the location of position detector 222F determines the predetermined position of a designated hold point. When an alarmed bag reaches position detector 222F, belt controller 224 stops motion of output belt segment 220C. As illustrated in FIG. 2, bag 248 is stopped in this predetermined position so that a baggage handler may readily identify the alarmed bag.

Belt controller 224 may operate other belt segments so that when a bag is alarmed, a single alarmed bag appears at the designated hold point. In some embodiments belt 220 may simply stop when the alarmed bag reaches the designated hold point. In this embodiment, other bags on belt 220 will continue to advance until the alarmed bag reaches the designated hold point. Thereafter all bags will stop. In other embodiments, the belt segments, such as segments 220A, 220B, 220C and 220D, may be controlled independently. Accordingly, it is not necessary that all bags stop when an alarmed bag reaches the designated hold point. For example, any bags on segment 220B may continue to move until they reach position detector 220E, representing the downstream end of belt 220B. In the process, one or more bags may pass through the active imaging section below X-ray scanner 230. As a result, image data may be collected on subsequent bags while belt segment 220C is stopped waiting for a handler to remove an alarmed bag from the designated hold point. By advancing the subsequent bag to the downstream end of belt segment 220B, immediately upon an indication that an alarmed bag has been removed from the designated hold point, the subsequent bag may be injected onto belt segment 220C and processed based on the image analysis performed while waiting for an operator to take possession of the previous bag that alarmed.

The number of subsequent bags that are imaged while belt segment 220C is stopped waiting for an operator to take possession of an alarmed bag may depend on the length of the various portions of belt 220. For example, if the portion of belt segment 220B between the exit of the active scanning region, as defined by position sensor 222D, and the down stream end belt segment 220B, as defined by position sensor 222E, is large enough to accommodate multiple bags, multiple bags may be imaged and queued at the down stream end of belt segment 220B while waiting for an operator to take possession of an alarmed bag waiting at a designated hold point on belt segment 220C. As described above, belt controller 224, operating in conjunction with one or more of the position detectors such as position detectors 222A or 222B, may determine the length of each item under inspection. The measured length may be used to determine the number of items that can be queued at the down stream end of belt segment 220B. Though, once the maximum number of subsequent bags is queued on belt 220B, motion of belt segment 220B may stop, until an operator indicates that the alarmed bag has been removed from the designated hold point.

Though, in some embodiments, other criteria, instead of or in addition to the number of bags queued at the down stream end of belt segment 220B may be used to determine when to stop motion of belt segment 220B. In some embodiments, it may be undesirable to stop motion of belt segment 220B when only a portion of a bag has been scanned by X-ray scanner 230. Such a condition may be undesirable, for example, in a volumetric CT scanner. Such a scanner collects data using a rotating X-ray source and detector as a bag moves past the source and detector on belt segment 220B. A full image of the item under inspection entails correlating rotation of the X-ray source and detector with motion of the bag. Because of the complexity of recreating this correlation if belt segment 220B is stopped and then restarted during the scan of a single item, it may be desirable in some embodiments not to begin a scan of an item unless the full scan can be completed. Accordingly, when the next item to be scanned will not fit at the down stream end of belt segment 220B, belt segment 220B may be stopped after one bag has been fully scanned but before scanning begins on the next item on belt segment 220B. In this scenario, when an alarmed bag is stopped at the designated hold point, belt segment 220B may be stopped when the next bag that cannot be fully scanned reaches position detector 222C, defining the input of the active scan area for X-ray scanner 230. In this way, the bag will be in position to immediately enter the active scan area once the alarmed bag is removed from the designated hold point.

However, to be able to stop belt segment 220B with a subsequent bag positioned at the input of the active scanning area, the preceding bag must have passed completely through the active scanning area when the subsequent bag reaches the input. For this condition to be satisfied, adjacent bags on belt segment 220B must have a gap at least equal to the width of the active scanning area. Spacing bags with gaps exactly equal to the width of the active scanning area may optimize throughput because it will increase on average the number of bags that may be queued on the down stream end of the belt segment 220B, while ensuring that belt segment 220B can stop with a bag at the input to the active scanning area without any preceding bag still in the active scanning area. Such a gap may be achieved by coordinated action of belt segments 220A and 220B.

In the embodiment illustrated, baggage handling area 226 is adjacent a work area 240 for a baggage handler. With the alarmed bag in baggage handling area 226, a baggage handler may readily process the bag. Work area 240 may include input-output devices that allow the baggage handler to interact with the control elements of the inspection system to obtain information about an item that has been inspected or to input information about an item.

In the embodiment illustrated, baggage handler work area 240 includes a display 246 to provide information to a baggage handler about bags that have been inspected. Display 246 may be a conventional computer display. However, in some embodiments, display 246 may be a touch screen display, providing a simple mechanism for a baggage handler to input information as well as to receive information about items being inspected.

Additionally, baggage handler work area 240 may include a scanner that may read an identifying indicia from bag 248. In the embodiment illustrated, bag 248 contains a barcode tag 249. In embodiments in which bags to be inspected are tagged with barcodes, baggage handler work area 240 may include a barcode scanner 244. However, baggage handler work area 240 may be configured to read any suitable indicia from baggage on conveyor 220 or apply a suitable indicia to baggage on conveyor 220. For example, if baggage is tagged with RFID chips, baggage handler work area 240 may contain a scanner that reads RFID data. In some embodiments, it is not necessary that an indicia be available for all bags. Accordingly, indicia may be read or applied to only alarmed bags. Accordingly, the invention is not limited by the type of indicia used to identify bags on belt 220 or by the types of input/output devices used by a baggage handler.

FIG. 2 shows that input/out devices in baggage handler work area 240 interface with a station controller 242. Station controller 242 may be a general purpose computer programmed to implement appropriate functions when operated by one or more baggage handlers in baggage handler work area 240. However, the specific implementation of station controller 242 is not a limitation on the invention and any suitable device may be used.

As shown, station controller 242 is connected over network 243 to image analyzer 232 and belt controller 224. Accordingly, all three units may exchange status and control information. For example, in operation, station controller 242 may receive outputs from image analyzer 232 for each bag inspected. Station controller 242 may use the information generated by image analyzer 232 to present to a baggage handler in work area 240 status information on each bag. Further, because station controller 242 is coupled to belt controller 224, station controller 242 has access to information about the position of each bag inspected that is gathered from position detectors 222A, 222B . . . 222F. With this information, station controller 242 may present on display 246 information about a bag correlated with its position on belt 220. In the embodiment illustrated, station controller 242 may present information about a bag, beginning at a time when the bag passes position detector 222E, indicating that the bag is exiting an inspection area and is therefore entering baggage holding area 226. Station controller 242 may remove the display of information about the bag as it passes position detector 222F and is therefore exiting baggage holding area 226. Displaying information about the bag while it is between position detectors 222E and 222F results in information about a bag being displayed only when the bag is in a predetermined position. A baggage handler can then readily correlate displayed information to a specific bag, which greatly reduces the risk that a baggage handler will erroneously move an incorrect bag.

In the embodiment illustrated, inspection system 210 includes features that further increase the likelihood that baggage handlers will correctly identify all alarmed bags and remove them for further search. In the embodiment illustrated, when image analyzer 232 alarms a bag, belt controller 224 operates belt 220 to move the bag to handling area 226. When a bag is in this position, a baggage handler in work area 240 may observe the bag on belt 220 and also observe display 246. In the embodiment illustrated, station controller 242 obtains information about the alarmed bag from image analyzer 232, including image information that allows station controller 242 to present a visual image of the bag.

In the embodiment illustrated, baggage handlers do not perform analysis on an alarmed bag to resolve whether the bag can be cleared. Rather, baggage handlers move alarmed bags to search station 260 where the resolution is made. Accordingly, station controller 242 does not need to display information about objects inside a bag that has been alarmed. Rather, information on display 246 may provide a mechanism for a baggage handler to verify that the information presented on display 246 corresponds with the bag at that time in the predetermined location. The information presented on display 246 may emphasize visible characteristics of a bag. Such information may simply be a representation of the exterior of the bag showing only its outline, for example. Such a representation allows a baggage handler to match the shape of a bag in the handling area 226 to the shape of the bag analyzed for the presence of contraband and provides a mechanism to verify that an alarmed bag is correctly selected for further processing.

When image analyzer 232 indicates that a bag is alarmed, belt controller 224 advances the bag to handling area 226, but stops belt 220 to hold the alarmed bag in handling area 226 until a baggage handler takes action to move the alarmed bag to search station 260. In addition, in the embodiment illustrated, the baggage handler must also use scanner 244 to record an indicia of the alarmed bag, such as by scanning barcode tag 249. As shown, scanner 244 is connected to station controller 242. Accordingly, station controller 242 receives the indicia of the alarmed bag read at scanner 244. Station controller 242 may use this information in any suitable way.

In the embodiment illustrated, station controller 242 uses the indicia read from an alarmed bag in two ways. First, reading the indicia may act as a signal that the alarmed bag was processed. For example, station controller 242 may signal over network 243 to belt controller 224 that the indicia has been read for the alarmed bag. In response, belt controller 224 may resume motion of belt 220. Second, the indicia may be used for tracking alarmed bags. For example, station controller 242 may provide the indicia to system controller 250. System controller 250 may store the indicia in database 254 and may use the stored indicia of alarmed bags to verify that each alarmed bag was searched at search station 260 or otherwise processed. In the embodiment illustrated, the baggage handler only scans indicia from alarmed bags, allowing for quicker processing of cleared bags. However, the baggage handler may also scan indicia from all bags, to allow for correlation of baggage results to passenger manifests or for other purposes.

Station controller 242 is shown coupled to system controller 250 over network 252. Station controller 242 may therefore communicate to system controller 250 information about alarmed bags. For example, station controller 242 may pass data on an alarmed bag gathered by image analyzer 232. Such information may include information such as an image of the alarmed bag, threat indications computed automatically by processing within image analyzer 232 and identifications of suspicious regions within the alarmed bag. In addition, station controller 242 may gather information about an alarmed bag through barcode scanner 242 or from a baggage handler interacting with station controller 242 through a user interface provided on display 246. Consequently, system controller 250 may receive information about each alarmed bag that may be stored in database 254. Database 254 may be implemented in any suitable way. Though shown as separate from system controller 250, database 254 may be implemented in computer-readable media contained within system controller 250 or in any other suitable location.

The connection between imaging system 210 and search station 260 through system controller 250 allows information relating to an alarmed bag to be transmitted to search station 260 so that it is available for processing when the alarmed bag is physically moved to search station 260. In the embodiment illustrated, search station 260 includes work area 270 for a searcher. Work area 270 may include a station controller 272 that is coupled over network 252 to system controller 250. In addition, work area 270 may include a scanner to read an indicia from a bag presented at search station 260. In the embodiment illustrated, baggage is tagged with barcodes. Bag 248', which represents an alarmed bag that has been transferred from imaging system 210 to search station 260 by a baggage handler, includes barcode tag 249'. The scanner, here illustrated as barcode scanner 274, may read tag 249', indicating to station controller 272 the identity of the bag presented for searching.

Station controller 272 may use an indicator of a bag read by barcode scanner 274 to access information concerning that bag from system controller 250. Accessing information may serve one or more functions. For example, station controller 272 may obtain from system controller 250 image information concerning objects within the bag. That information may be presented on display 276 for review by a human searcher within work area 270. A human search may be guided in a physical search of bag 248' with that information or may use that information to resolve an alarm caused by bag 248' without a search. Accordingly, in the embodiment illustrated, display 276 presents more information concerning objects within bag 248' than display 246. In embodiments in which the information accessed by station controller 272 includes information about suspicious regions within bag 248' or other information generated by image analyzer 232, this information may be presented to searcher through display 276. A manual search at search station 260 is not a requirement of the invention. In some embodiments, the image presented on display 276 may be the same as that presented on an operator interface associated with a conventional inspection system. Making this information available to an operator at an off-line search station allows operator review of automated analysis, as in the prior art. However, the operator review occurs off-line, which can significantly reduce the amount of time that belt 220 is stopped to process each alarmed item. Accordingly, actions taken at search station 260 may include any suitable combination of operator review of image data, physical search or other types of inspection.

Station controller 272 may serve other functions as part of the inspection process. For example, station controller 272 may provide information to system controller 250 indicating which bags have been processed at search station 260. System controller 250 may use this information to verify that all alarmed bags are appropriately searched. In this way, the progress of an alarmed bag may be tracked from handling area 226 to search station 260 until a final resolution of the threat is made. Specifically, a bag may be imaged inside a tunnel, such as tunnel 122 (FIG. 1). The tunnel prevents the bag from being unintentionally removed. If the bag is alarmed, it will pass from the tunnel to handling area 226, where the bag will stop until processed by a handler. In the embodiment illustrated, the bag should be the only bag available to a handler and a visual representation of the bag may be presented so that the baggage handler can verify that the bag in the handling area is the alarmed bag. Because the indicia of the bag is recorded by barcode scanner 244, the bag is identified with high reliability in handling area 226, and the chance of error in identifying the alarmed bag is greatly reduced. Once the indicia of the bag has been recorded, if the bag is not searched at a search station 260, corrective action can be taken.

Figure 3:
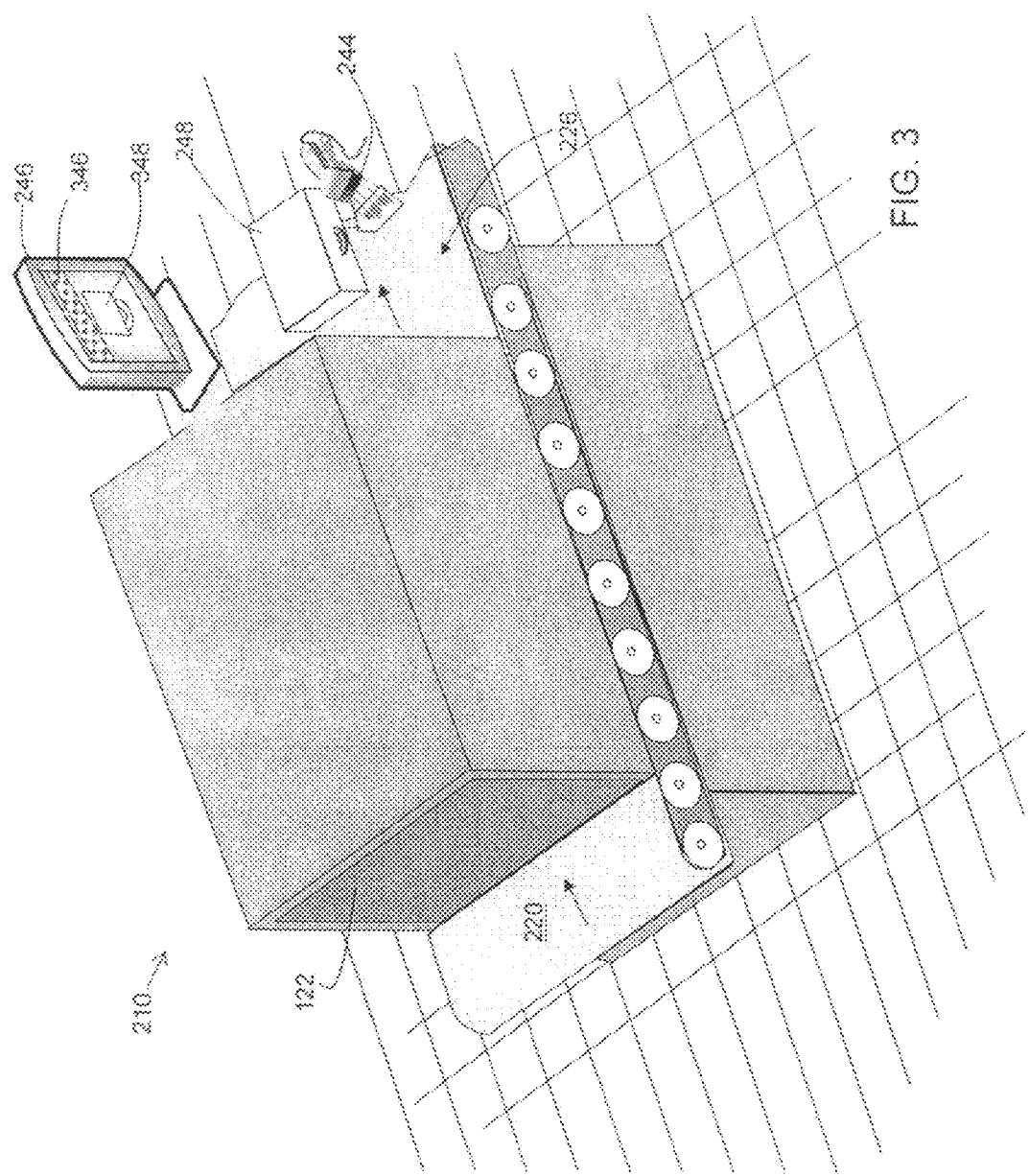
FIG. 3 is a sketch of an inspection system according to an embodiment of the invention.

Turning to FIG. 3, a sketch of an imaging system, such as imaging system 210 is shown to provide a perspective on the relative position of components of an inspection system in some embodiments. In the embodiment illustrated, imaging system 210 contains components similar to those of a stand-alone inspection system in the prior art as illustrated in FIG. 1. As can be seen, imaging system 210 contains a tunnel 122 through which conveyor 220 passes. Baggage, or other items under inspection, may pass through tunnel 122. Inside tunnel 122, data on objects within each bag may be collected. This data may be analyzed to detect bags containing suspicious regions.

For bags containing suspicious regions, conveyor 220 is controlled to stop with the bag, such as bag 248, in handling area 226. A scanner, such as barcode scanner 244 is positioned in handling area 226 so that a human operator may scan an indicia, such as barcode tag 249, associated with bag 248.

As can be seen, display 246 is positioned to be visible by a human baggage handler looking at bag 248 in handling area 226. As shown, display 246 presents information to a baggage handler concerning the bag. In this example, display 246 contains a visual indicator 346 that the bag has alarmed. In addition, display 246 presents an image 348 of the exterior of bag 248. In the embodiment illustrated, image 348 is generated from x-ray data collected by image analyzer 232. In this way, the handler can verify that the bag in handling area 226 is the same bag that generated the alarm.

In the embodiment of FIG. 3, barcode scanner 244 is illustrated as a handheld barcode scanner. However, any suitable barcode scanner or other scanning may be used. For example, the scanner may be connected to a station controller through a wired or wireless or any other suitable connection.

Turning to FIG. 4, additional details of an embodiment of display 246 are illustrated. As shown, display 246 presents a user interface to a handler or other human operator. As can be seen in FIG. 4, visual indicator 346 may be presented with text indicating the status of a bag in handling area 226. Color or other suitable graphics may be used to make the text stand out. However, any suitable visual indicator may be used to indicate the status of a bag. For example, all or portions of the display may be turned red or any other suitable color to indicate an alarmed bag.

Though not expressly shown in FIG. 4, the status of a bag in handling area 226 may be indicated on display 246 even if the bag is not alarmed. For example, by presenting an image, such as image 348, of a bag in handling area 226, for bags that are not alarmed, a handler may verify proper operation of inspection system 210. When the image 348 on display 246 does not match the bag in handling area 226, a baggage handler or other human operator may detect an improper operating condition of imaging system 210 and may take corrective action.

FIG. 4 also illustrates other functions that may be performed through display 246 as part of a user interface. In the example illustrated, display 246 may be implemented using a touch screen or other suitable mechanism that allows input from a user. In the embodiment illustrated in which display 246 has a touch screen, user input may be received by presenting soft keys or other visual indicators of commands in designated locations on display 246. When display 246 senses a touch in the designated area, display 246 may report user input to station controller 242 or other suitable controlling device. For example, as illustrated in FIG. 4, soft key 410 is included on display 246. If a user touches display 246 in the vicinity of soft key 410, display 246 will report to station controller 242 user input representing a "go" command. Such a command, for example, may be provided to belt controller 224 (FIG. 2) to start operation of belt 220 after an alarmed bag has been processed.

FIG. 4 shows that other soft keys, such as soft keys 412, may likewise be presented on display 246. Because soft keys are programmable, any one or more soft keys may be programmed to perform any desired function in response to user input. For example, a soft key may be used by an operator to indicate that an alarmed bag has been moved to search station 260 or that the operator has otherwise taken possession of the alarmed bag.

Figure 5A:
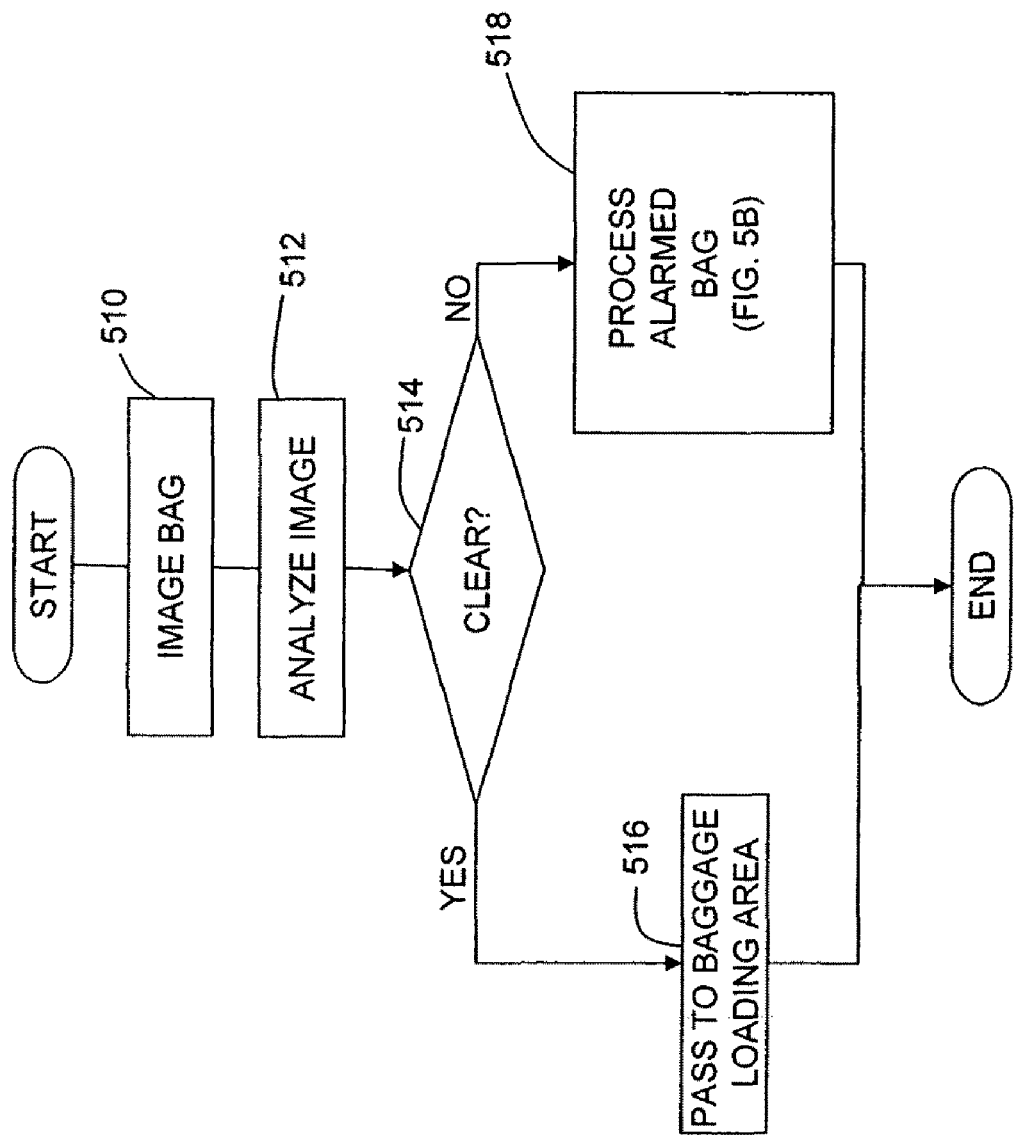
FIG. 5A is a flow chart of an inspection process according to an embodiment of the invention.

Regardless of the specific hardware used to implement inspection system 200, the inspection system may be operated in a stand-alone configuration to provide a high throughput inspection process with low risk that an alarmed bag will be inadvertently passed to a loading area. FIG. 5A illustrates a process that may be performed during operation of such an inspection system. In the example of FIG. 5A, the process begins at block 510 where an image of a bag under inspection is acquired. As described above, the image may be acquired using projection imaging, multi-energy x-ray imaging, computed tomography or any other suitable imaging technology.

Once an image is acquired, the process proceeds to block 512, where the image is analyzed. The image may be analyzed in any suitable way, whether now known or hereafter developed. Analysis at block 512 results in an indication of whether the bag is cleared or alarmed.

The process branches at decision block 514 depending on the status of the bag assigned as a result of the analysis performed at block 512. If, as determined at decision block 514, the bag is cleared, processing proceeds to block 516. FIG. 5A represents a process that may be performed in inspecting checked baggage at an airport. In that case, cleared bags are processed by passing them to a loading area where cleared bags may be loaded onto an aircraft. Accordingly, if as determined at decision block 514, a bag is cleared, the process branches to decision block 516 where the cleared bag is passed to a baggage loading area. However, any suitable processing of a cleared bag may be performed. For example, the bag may be allowed into a secured area or returned to a traveler. Regardless of the specific processing performed on a cleared bag, the process may thereafter end.

Conversely, if as determined at decision block 514, the bag is not cleared, processing proceeds to block 518. Block 518 represents processing of an alarmed bag, which is illustrated in more detail in FIG. 5B.

Processing of an alarmed bag in FIG. 5B begins at block 530. At block 530, the alarmed bag is moved to a location where it can be easily recognized by a baggage handler as a bag requiring further processing. In the embodiment depicted in FIG. 5B, that location is adjacent an exit of a tunnel of an imaging system. In such an embodiment, all bags processed by the imaging system may be routed to the same location. However, different locations may be used for different bags. For example, an output conveyor, such as output conveyor segment 220C (FIG. 2), may be configured to route an alarmed bag to any one of multiple predetermined locations, each associated with a baggage handler or carrier. Any suitable algorithm may be used to determine, for any given bag, the intended destination. Accordingly, a bag may be routed to a location which may be any location in the range of possible locations where a baggage handler, or a mechanical system, may thereafter deal with the alarmed bag.

When the bag is in the predetermined location, processing proceeds to block 532. At block 532, motion of the alarmed bag stops. In this example, the alarmed bag is driven on a conveyor and the bag is stopped in the predetermined location by stopping the conveyor. However, any other mechanism, including erecting a gate or other barrier, may be used to arrest motion of the alarmed bag in the predetermined location.

With the bag in the predetermined location, the process continues to block 534. At block 534, an image of the alarmed bag is displayed for a baggage handler to observe. As described above, display of an image of the bag allows a baggage handler to verify that the bag in the predetermined location is the same bag that generated the alarm. Accordingly, processing at block 534 may include displaying the image in the predetermined location.

At block 536, a record of an identifier associated with the bag is recorded. In the embodiments illustrated in FIGS. 2 and 3, the identifier is recorded using a barcode scanner. However, processing at block 536 may use any suitable mechanism to record identifying information about a bag or simply record an acknowledgement from the operator that the operator has acted on the bag. Though, in some embodiments, a bar code or other indicia is only read if a bag has generated an alarm. A bag may not be bar coded or otherwise coded with an indicia for tracking the bag unless the bag alarms. In such an embodiment, processing at block 536 may alternatively entail applying the bar code or other indicia in addition to recording its number.

At block 538, the bag is moved for further processing. In the embodiment illustrated in FIG. 2, an alarmed bag is moved to a search workstation for alarm resolution, which may possibly include a physical search of the bag. Movement of the bag at block 538 may be performed manually by a human baggage handler or any other suitable means.

Regardless of how the bag is moved from the imaging system, once an identification of the bag is recorded and the bag is moved, the process proceeds to block 540. At block 540, motion of the conveyor may be resumed so that further bags may be imaged.

The process then proceeds to decision block 542, where a determination is made whether the alarmed bag has been resolved. Though shown to occur sequentially following block 540, processing at block 542 may be performed in a background process such that processing at decision block 542 may be performed at any suitable time. For example, the processing at decision block 542 may be performed a predetermined amount of time after the processing at block 536 where an indicia of the alarmed bag is recorded. Meanwhile, the system would start the process on the next bag. However, the timing of processing at decision block 542 may be determined in any suitable way.

It should be noted that the process illustrated is of a "pipelined" nature. That is to say that while one bag is having its ID read (block 536), the next bag may be getting analyzed (block 512) while a third bag may be getting imaged (block 510). At any given time, multiple bags may be at different points in the process. Further the resolving process (block 542) may be decoupled from the rest of the process. That is to say that bags may queue up waiting to be resolved at the search station, without affecting the progress of the main inspection process. In the preferred embodiment, however, the bags would be resolved at the same rate they are alarmed so as to prevent a build up of unfinished baggage.

As another example, statistics may be kept on the amount of time taken for a bag once moved to a search workstation to be resolved and may be used to determine how long the system should wait for an alarmed bag to be processed. Accordingly, the time of execution of the actions indicated in decision block 542 may be determined adaptively based on the rate at which bags are processed in inspection system 200.

Regardless of how a time is determined for the process performed in decision block 542, at some time after an alarmed bag should have been moved to a search workstation at block 538, a check may be made at decision block 542 of whether the alarmed bag was resolved. If the bag was resolved through search or other inspection, the processing illustrated in FIG. 5B ends. Conversely, if as determined in decision block 542, the bag has not been resolved after an expected amount of time, an exception condition exists. Accordingly, processing branches to exception handler 546. The processing may branch to exception handler 546, for example, if an alarmed bag is diverted or otherwise mishandled before reaching a search station. In response, any suitable corrective action can be taken, including initiating a search for the bag.

However, as indicated by block 538, normal processing for an alarmed bag is to move the bag to a search station. FIG. 5C illustrates a process that may be performed on an alarmed bag once it is moved to a search station, such as search station 260.

The process of FIG. 5C begins at block 560, where a bag indicia is read and recorded. The bag indicia may be read at block 560 in the same way that an indicia is read at block 536. In the embodiment illustrated in FIGS. 2 and 3, each bag is tagged with a unique barcode, which is read with a barcode scanner. However, any suitable identification information may be read and recorded.

Regardless of the form of identification information, the information at block 560 may be used to provide the user access to the data associated with the specific bag. It may also be used for further processing of an alarmed bag. For example, it may be used at decision block 542 (FIG. 5B) to verify that every alarmed bag has been processed. The specific manner in which the information read at block 560 is recorded to allow this determination to be made is not a limitation on the invention. However, in the embodiment of FIG. 2 in which information on alarmed bags is stored in database 254, a record may be created by system controller 250 for each alarmed bag. The information obtained at block 560 may then be stored in that record to indicate that the alarmed bag was processed at a search station. In this way, records maintained by system controller 250 may store information useful for identifying alarmed bags that were not resolved.

The process of FIG. 5C continues to block 562. At block 562, the alarmed bag is inspected. Any suitable inspection technique may be employed. For example, image information previously obtained may be a presented to a human expert for analysis. Inspection based on analysis of image data may be augmented by a physical search of the item or with other information acquired at the search station. For example, a chemical analysis could be performed to detect explosive residue or other indicators of contraband within the item under inspection.

Regardless of the specific inspection techniques used, the process continues to decision block 564. At decision block 564, the process branches depending on whether the inspection at block 562 cleared the bag. If the bag is cleared, the process branches to block 568. At block 568, the cleared bag is passed to baggage loading area. Any suitable mechanism may be used to pass the bag to a loading area. For example, a human baggage handler may carry the bag to the loading area or place the bag on a conveyor leading to the loading area.

Conversely, if the bag is not cleared, the process branches from decision block 564 to block 566. The specific processing performed at block 566 may depend on the type of inspection performed at block 562 and the setting in which the security inspection system is employed. In the embodiment illustrated in FIG. 5C, the inspection performed at block 562 represents a second level inspection and the security inspection system is employed in a setting in which three or more levels of inspection are used. Accordingly, the processing at block 566 involves passing the bag, which could not be cleared, for a next level of inspection. However, any suitable processing may be performed at block 566. For example, in some embodiments, a bag that could not be cleared as a result of inspection at block 562 may be destroyed or otherwise processed as a high-level security risk. Regardless of the specific processing performed at block 566, the inspection subprocess illustrated in FIG. 5C thereafter ends for that item, through the process of FIG. 5C may be repeated for other alarmed bags.

As described above, in some embodiments it may be desirable for bags to be positioned on belt segment 220B with a gap between bags larger than the length of the active scanning region, but as close to that length as possible. FIG. 6A illustrates a process of loading bags into an inspection machine, such as the inspection machine illustrated in FIG. 2, to achieve this bag spacing. The process of FIG. 6A begins at block 612 where a bag is injected into the inspection area. In the example of FIG. 2, the bag is injected into the inspection area by advancing belt segment 220A until a bag on belt segment 220A transition onto belt segment 220B.

As one bag moves from the input belt to the inspection segment, further bags may be placed on the input belt. Accordingly, the process proceeds to block 614 where the next bag is placed in the input belt, such as belt segment 220A.

At block 616, the input belt segment is advanced until the next bag on the input belt segment reaches the down stream end of the input belt segment. In the system illustrated in FIG. 2, processing at block 616 may be achieved by advancing belt segment 220A until a bag is detected by position detector 220B.

The process then branches depending on the position of the previous bag injected into the inspection area. If belt segment 220B has advanced at least the distance D, representing the width of the active scanning region, since the bag was injected at block 612, the system may determine that injecting the next bag at the end of the input belt segment will result in adjacent bags spaced on belt segment 220B by at least the distance D. Accordingly, the process branches from decision block 618 to block 622 where the bag at the end of the input belt segment 220A is advanced on to belt segment 220B. The process then loops back to block 614 where a further bag is placed on the input belt segment and processed in the same way to ensure the desired bag spacing on belt segment 220B is achieved.

Conversely, if as a result of processing at decision block 618, it is determined that when the next bag reaches the end of input belt segment 220A, the previous bag has not advanced on belt segment 220B by at least a distance D, the process branches to block 620. At block 620, the system waits without advancing belt segment 220A. The process branches back to decision block 618, creating a wait loop until the previous bag injected onto belt segment 220B had advanced a sufficient distance.

The process may continue in this fashion as more bags are placed on input belt 220A. In this way, bags on belt segment 220B will have adjacent bags spaced by a distance of at least D.

The simplified exampled of FIG. 6A illustrates a single bag at a time on input belt segment 220A. In some embodiments, multiple bags may be placed simultaneously on input belt segment 220A. However, regardless of the number of bags at input belt segment 220A, the belt segment 220A may stop as each bag reaches the down stream end of input belt segment 220A. In that position, the processing illustrated by decision block 618 and blocks 620 and 622 may be performed on the bag.

Figure 6B:
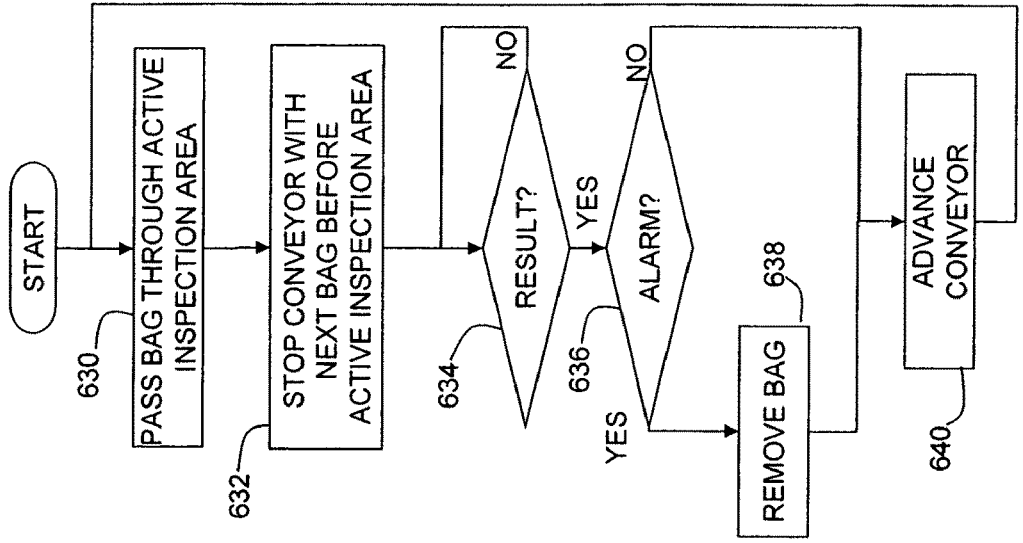
FIG. 6B is a flow chart of a process for inspecting bags in an inspection system operating in stand-alone mode according to an embodiment of the invention.
Figure 6A:
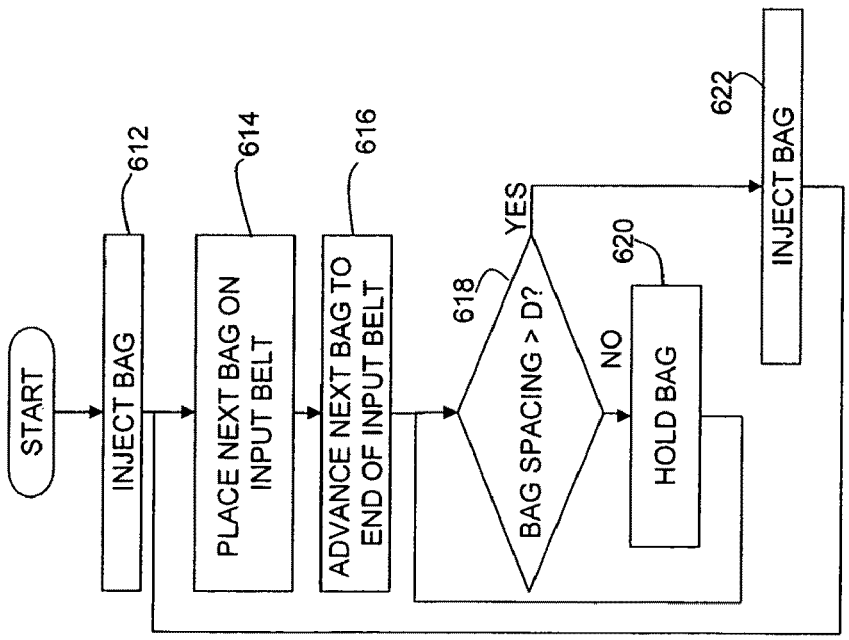
FIG. 6A is a flow chart of a process for loading bags into an inspection system operating in stand-alone mode according to an embodiment of the invention.

FIG. 6B illustrates an inspection process that may be performed to take advantage of bag spacing achieved with the loading and process illustrated in FIG. 6A. The process of FIG. 6B begins at block 630 where a bag is passed through the active inspection area of the inspection machine. At block 632, the belt carrying bags through the active inspective area may be stopped with the next bag immediately before the active inspection area. Because of the spacing applied by the loading process of FIG. 6A, the prior bag will have cleared the active inspection area when the next bag reaches the input of the inspection area. Accordingly, when the belt stops at block 632, there are no bags partially within the active inspection area.

The belt may remain stopped until a result is available on the bag that has passed through the active inspection area. Accordingly, the process of FIG. 6B includes decision block 634. At decision block 634, the process loops back if no result is available on that bag. In this way, the process will wait with the next bag to be inspected at the input to active inspect area until a result is available.

Conversely, if an inspection result is available for the bag that has passed through the active inspection area, the process continues to decision block 636. At decision block 636, the process again branches depending on whether the results indicate that the previously imaged bag is alarmed. If the bag is not alarmed, the process branches from decision block 636 to block 640, where the conveyor carrying bags through the inspection area may resume motion. Conversely, if the bag alarms, the process branches from decision block 636 to block 638. At block 638, the alarmed bag may be removed or an operator may otherwise take possession of the bag. Thereafter, the process proceeds to block 640 where motion of the conveyor may resume.

Once the conveyor again begins to move at block 640, the process may loop back to block 630 where a further bag may pass through the inspection area, and image data may be collected on the bag. The process continues in this fashion, with bags being inspected sequentially.

The process of FIG. 6B results in a bag being positioned at the input of the active inspection area so that the bag may enter the active inspection area as soon as the system determines that the next bag can be processed. In this way, throughput of the overall system may be increased. In the example of FIG. 6B, the conveyor moving bags through the inspection area stops while awaiting results for each bag imaged. In some embodiments, the conveyor may not need to stop after each bag is imaged. For example, screening results of a bag may be available before the next bag reaches the input of the inspection area. Alternatively, the system may be constructed with sufficient buffer areas in which bags can be held after they are imaged until an inspection result is available. In those scenarios, processing at block 632, which includes stopping the conveyor with the next bag at the input of the active inspection area, may be performed only if the system stops because of an alarmed bag. As an example of an alternative embodiment, the processing of block 632 may be performed prior to the processing of block 638.

Figure 6C:
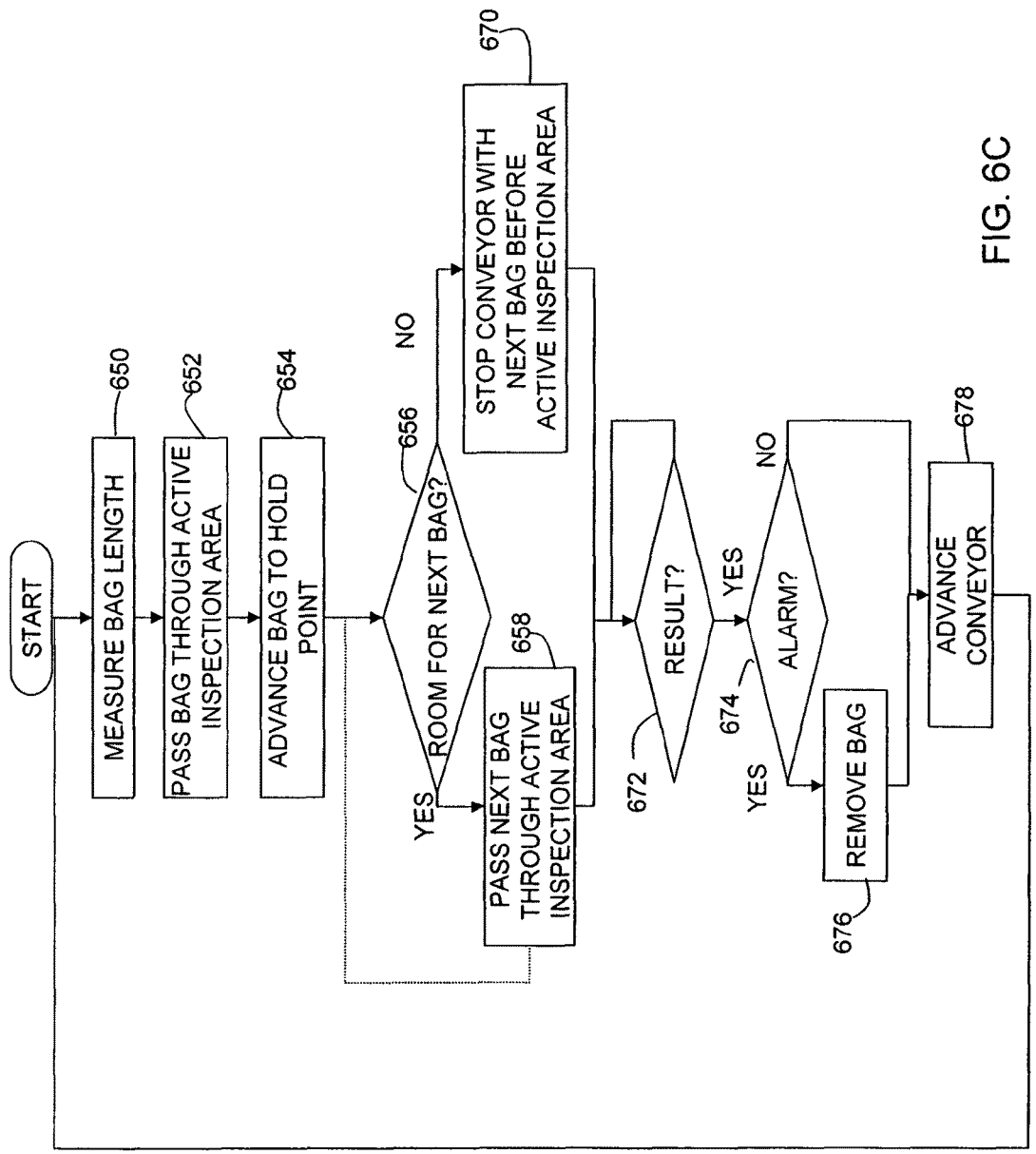
FIG. 6C is a flow chart of an alternative embodiment of a process of inspecting bags in an inspection system operating in stand-alone mode according to an embodiment of the invention.

FIG. 6C illustrates a further alternative embodiment in which the conveyor conditionally stops following inspection of a bag. By conditionally stopping the conveyor in response to conditions within the inspection system, the conveyor may continue to move in more scenarios, increasing the overall system throughput.

The process of FIG. 6C begins at block 650 where the length of a bag being input into the inspection system is measured. At block 652, that bag passes through the active inspection area, where an image of the bag is acquired. That image may be analyzed to determine whether the bag should be cleared or alarmed.

As the image is being analyzed, the bag may advance to a hold point, as indicated by the processing at block 654.

At decision block 656, the process may branch depending on whether there is room in the system for the next bag to advance into the active inspection area. Room may be available for another bag within the system if the system contains a buffering area to hold bags while awaiting an inspection result. An inspection area may be implemented by providing a relatively long conveyor between the active inspection area and the hold point, or in any other suitable way. Room may also be created if previously inspected bags have been cleared and advanced quickly out of the system. Regardless of the configuration of the inspection system and operating conditions that may create space for a next bag, the available space is compared to the length of the next bag. As described above, the length of each bag may be measured as it is input into the inspection system. Based on a comparison of the available space to the bag size, the process may branch at decision block 656.

If, as a result of the comparison made at decision block 656, the system determines that there is room for the next bag, the process branches to block 658. At block 658, the next bag is passed through the active inspection area. As with processing at block 652, an image of the next bag is acquired as it passes through the active inspection area at block 658. Once this "next" bag is processed through the active region, the system may again consider whether there is room for the following bag to be accommodated without requiring a "held" bag to pass the control point. Accordingly, FIG. 6C illustrates that the process may branch to decision block 656 following block 658 to determine whether another bag may be accommodated. Once the system cannot scan any more bags without causing a held bag to pass the control point, the decision in block 656 yields a no and the process branches to block 670.

Conversely, if as a result of processing at decision block 656, it is determined that there is not sufficient room for the next bag to pass through the active inspection area, the process branches to block 670. At block 670, the conveyor is stopped with the next bag positioned before the active inspection area. In this condition, the next bag is ready for inspection and can be inspected without delay once space is available for the bag at the down stream side of the active inspection area. With the conveyor stopped, the process then proceeds to decision block 672.

Processing may reach decision block 672 whether or not there is room for the next bag down stream side of the active inspection area. Regardless of the path by which processing reaches decision block 672, at decision block 672 the process may branch depending on whether a result is available for a bag being advanced to the hold point. If no result is available, the process loops back, creating a wait loop. The process may wait with the bag advanced to the hold point until a result is available. When a result is available, the process branches to decision block 674.

At decision block 674, the process branches, depending on the result. If the result indicates that the bag is not alarmed, processing branches to block 678. At block 678, the conveyor again advances, moving the bag past the hold point. Thereafter, the process may loop back, allowing multiple bags to be examined in succession.

Conversely, if the result indicates that the bag at the hold point is alarmed, processing branches from decision block 674 to block 676. At block 676, the bag at the hold point is removed from the hold point. Once removed, the bag may be subject to further inspection or otherwise taken off line. Once the bag is removed from the hold point, the process continues to block 678 where conveyors in the system are again advanced. Thereafter, the process loops back, allowing further bags to be inspected in succession.

The process of FIG. 6C is a simplified representation of processes that may be performed within an inspection system. In an inspection system with multiple belt segments that may be independently controlled, some of the processing illustrated in FIG. 6C may be performed simultaneously. Accordingly, in some embodiments, the process may not have a linear flow as indicated in FIG. 6C. Nonetheless, the simple example of FIG. 6C indicates efficiencies that may be achieved by conditionally passing bags through the active inspection area. As can be seen in FIG. 6C, bags will enter the active inspection area if they can be fully imaged without stopping. Such a scenario ensures that images are not corrupted by stopping motion of a bag partially through the active inspection area. In scenarios in which the bag may be imaged without stopping, the image may be obtained while processing of previously imaged bags occur. By enabling imaging and processing in parallel, overall system throughput may be improved. In scenarios in which the system can not image a subsequent bag without stopping the conveyor, that bag is nonetheless positioned so that it can be quickly injected into the active inspection area once conditions are established under which the bag can be imaged without stopping in the active inspection area. In this way, throughput is also improved.

Having thus described several aspects of at least one embodiment of this invention, it is to be appreciated that various alterations, modifications, and improvements will readily occur to those skilled in the art.

For example, information on items under inspection is described to have been collected using any x-ray scanner. Any suitable inspection technique may be used to obtain data on an item. For example, radiation at different energy levels, such as teraHertz radiation, may be used. Further, it is not necessary that data be collected in the form of attenuation measurements. Transmission or backscatter measurements may be used to obtain data on an item under inspection.

As another example, indicia read by scanner 244 and used to signal that an alarmed bag has been processed by a handler and belt controller 224 may thereafter resume motion of belt 220. Though, in some embodiments, belt controller 224 may use additional or different information to determine that an alarmed bag has been appropriately handled. For example, the output of position detector 224F may reveal that an alarmed bag has been removed from handling area 226.

Also, it was described that an image depicting the outline of an item under inspection was prepared from x-ray data. In embodiments in which the baggage handler does not use the image to make a determination about objects inside the item under inspection, a visual light camera could be incorporated into the inspection system to form a visual image of each item while an x-ray image of the item is formed. In such an embodiment, a visual image from the camera could be presented to the baggage handler as each item passes through the baggage handling area.

Further, it was described that status and other information is presented in visual form to a baggage handler. Information, such as whether a bag is alarmed or cleared, may be presented audibly or in any other suitable form.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of inspecting a plurality of items, the method comprising:
    a) in an active inspection area, obtaining data on each of the plurality of items;
    b) automatically analyzing the data to identify an item of the plurality of items as a suspect item and identifying items of the plurality of items as cleared items;
    c) on a conveyor segment, moving each of the plurality of items to a reference point outside the active inspection area;
    d) moving the cleared items past the reference point without stopping the conveyor, and stopping the conveyor segment when the suspect item reaches the reference point;
    e) recording an indicia of the suspect item while the suspect item is stopped at the reference point; and
    f) automatically moving the conveyor in response to the act e) of recording the indicia.

2. The method of claim 1, wherein recording an indicia comprises reading a barcode affixed to the suspect item.

3. The method of claim 1, further comprising:
    g) displaying an image of each of the plurality items while the item is on the conveyor segment at the reference point.

4. The method of claim 1, further comprising:
    g) moving the suspect item to an inspection area; and
    h) accessing the obtained data on the suspect item based on the recorded indicia.

5. The method of claim 1, wherein:
    the conveyor segment comprises a first conveyor segment;
    the act a) of obtaining data on each of the plurality of items comprises moving the plurality of items through the active inspection area on a second conveyor segment; and
    the method further comprises moving at least one item of the plurality of items through the active inspection area on the second conveyor segment while the first conveyor segment is stopped.

6. The method of claim 1, wherein the method further comprises:
    g) displaying an image of each of the plurality of items while the item is at the reference point.

7. The method of claim 6, further comprising, when the conveyor segment is stopped:
    h) taking possession of the s uspect item by an operator; and
    g) in response to an indication that the operator has taken possession of the suspect item, resuming motion of the conveyor segment.

8. The method of claim 7, wherein the act g) of displaying the image comprises displaying the image in a location visible to the operator observing the reference point.

9. An inspection system adapted to inspect a plurality of items, the inspection system comprising:
    a) an inspection area having an exit;
    b) a conveyor moving through the inspection area;
    c) a display disposed adjacent the exit; and
    d) a scanner disposed adjacent the exit, the scanner adapted to obtain identifying information from a tag affixed to an item under inspection.

10. The inspection system of claim 9, wherein the scanner comprises a barcode reader.

11. The inspection system of claim 9, further comprising:
    e) a position detector, disposed adjacent the exit, the position detector having an output indicating an item under inspection on the conveyor has reached a position.

12. The inspection system of claim 11, further comprising:
    f) an x-ray scanner adapted to obtain data on an item in the inspection area;
    g) an analyzer coupled to the x-ray scanner, the analyzer being adapted to automatically analyze the data of the item and to output an indication of whether the item contains a suspicious region; and
    h) a controller, coupled to the analyzer and the position detector, the controller being adapted to control motion of the conveyor to stop the conveyor when an item under inspection is in the position if the analyzer indicates that the item contains a suspicious region.

13. The inspection system of claim 12, wherein the x-ray scanner forms a three dimensional representation of the item under inspection and the display displays a two dimensional representation of the item under inspection.

14. The inspection system of claim 13, wherein the display displays the representation of the item with an orientation matching the orientation of the item on the conveyor.

15. The inspection system of claim 14, wherein:
    the conveyor comprises a first conveyor segment at the exit and a second conveyor segment within the inspection area, the first and second conveyor segments being independently controllable; and the controller is adapted to move the second conveyor segment while the first conveyor segment is stopped.

16. A method of operating an inspection system comprising an active scanning region to inspect a plurality of items in a stream, the method comprising:
   a) positioning items in the stream on a conveyor with a gap between adjacent items in the stream approximating the length of the active scanning region of the inspection area;
   b) moving items in the stream on the conveyor through the active inspection area;
   c) collecting data indicative of contents of each item in the stream as the item passes through the active inspection area to automatically identify an item in the stream as a suspicious item; and
   d) in response to identifying a suspicious item, stopping the conveyor with the suspicious item and a preceding item in the stream positioned with the active scan region aligned with the gap between the suspicious item and the preceding item.

17. The method of claim 16, further comprising:
   e) analyzing data collected on the suspicious item to determine whether the suspicious item is cleared or alarmed; and
   f) resuming the motion and inspection process of subsequent bag in response to a determination that the suspicious item is cleared.

18. A method of inspecting and controlling a plurality of items, the method comprising
   a) moving the plurality of items through an inspection area towards a control area;
   b) collecting data indicative of contents of each item as the plurality of items passes through the inspection area;
   c) analyzing the data on each item to determine whether the item is an item of interest;
   d) controlling the motion of the items such that
      i) no item passes through the control area before analysis of data on the item is complete;
      ii) when analysis of data on an item has been completed and the item has been found to be an item of interest, that item of interest does not exit the control area without positive indication from an operator that the operator is aware of the item's status and is ready to remove the item from a stream of cleared items.

19. The method of claim 18, wherein the positive indication is given by the operator pressing a button.

20. The method of claim 18, wherein the positive indication is given by the operator pressing a softkey on a display.

21. A method of inspecting a plurality of items, the method comprising:
   a) moving the plurality of items through an inspection area;
   b) physically spacing the items such that a gap between items is effectively minimized but greater than or equal to the length of an active scanning region of the inspection area;
   c) measuring the length of the items,
   d) collecting data indicative of item content on each item as the plurality of items passes through the inspection area;
   e) controlling movement of the items such that:
      i) no item exits a control area before analysis of data collected on the item is complete;
      ii) stopping movement of the items is coordinated to align the active scan region with the gap between items;
      iii) the measured item lengths are used to allow additional items to be scanned if the items can be advanced to align the next gap with the active inspection area without advancing an item for which data analysis has not been completed exits the designated control area; and
   f) analyzing the data collected to determine whether each item is of interest.

22. A method of manually verifying the tracking of a plurality of items being inspected, the method comprising:
   a) moving the plurality of items through an inspection area;
   b) collecting data on each item as the plurality of items passes through the inspection area;
   c) displaying the data collected on each item near the exit of the inspection area such that the data displayed is correlated in time to when the physical item corresponding to the data is passing the display point; and
   d) verifying the item passing the display point matches the data displayed, whereby a determination may be made that the system is tracking properly.

23. The method of claim 22, wherein the data displayed is image data.

24. The method of claim 23, wherein the image data is created from x-ray transmission data.

25. A method of inspecting a plurality of items that decouples human inspection tasks from automated tasks, the method comprising of:
   a) moving the plurality of items through an inspection area;
   b) collecting data indicative of item content on each item as the plurality of items passes through the inspection area;
   c) with at least one processor, automatically analyzing the collected data to identify whether the item is a suspect item or a cleared item;
   d) correlating each suspect item with its automated results and data via a physical indicia associated with the suspect item;
   e) manually sorting items automatically identified as suspect from those items cleared;
   f) manually transferring the suspect items to a search station, allowing the automated inspection of subsequent items to continue independent of the rate of manual review; and
   g) manually reviewing the automated decisions and associated data at the search station to resolve whether the suspect items can be cleared without physical search.

26. A method for associating physical indicia with data and results for a plurality of items being inspected, the method comprising:
   a) moving the plurality of items through an inspection area;
   b) collecting data on each item as the plurality of items passes through the inspection area;
   c) recording an indicia of each item, where the recording is done after the inspection data has been collected; and
   d) associating the recorded indicia with the inspection data of the item.

27. The method of claim 26, wherein recording an indicia comprises reading a barcode affixed to the item.

28. The method of claim 26, wherein the inidicia is only recorded for items determined to be of interest by an intervening analysis.

* * * * *